United States Patent [19]

Abe

[11] Patent Number: 5,687,015

[45] Date of Patent: Nov. 11, 1997

[54] RADIO APPARATUS

[75] Inventor: Satoru Abe, Kawasaki, Japan

[73] Assignee: Fujitsu Limited, Kanagawa, Japan

[21] Appl. No.: 617,290

[22] Filed: Mar. 18, 1996

[30] Foreign Application Priority Data

Jul. 3, 1995 [JP] Japan .................. 7-167346

[51] Int. Cl.⁶ .................................. H04B 10/00
[52] U.S. Cl. .............. 359/161; 359/158; 370/503; 375/365; 327/292
[58] Field of Search .................. 359/158, 137, 359/138, 139, 140, 123, 125, 136, 118, 161; 370/395, 503, 509, 510, 512, 518; 375/364, 365; 465/51.1; 371/5.4, 47.1; 327/144, 292

[56] References Cited

U.S. PATENT DOCUMENTS

| 5,007,070 | 4/1991 | Choa et al. ................. 375/118 |
| 5,390,185 | 2/1995 | Hooijmans et al. .......... 370/98 |
| 5,543,951 | 8/1996 | Moehmann .................. 359/158 |
| 5,587,996 | 12/1996 | Mizuno ....................... 370/228 |

FOREIGN PATENT DOCUMENTS

| 61-173600 | 8/1986 | Japan ............... H04Q 11/04 |
| 1208047 | 8/1989 | Japan ............... H04L 11/00 |
| 07-095677 | 4/1995 | Japan ............... H04Q 11/04 |
| 2261800 | 5/1993 | United Kingdom ... H04L 12/40 |

Primary Examiner—Wellington Chin
Assistant Examiner—Rafael Bacares
Attorney, Agent, or Firm—Helfgott & Karas, P.C.

[57] ABSTRACT

Disclosed is a radio apparatus in a synchronous digital hierarchy (SDH) network in which a radio transmission line having a plurality of radio lines is installed between optical transmission lines each having a plurality of optical lines. The radio apparatus includes a plurality of channel boards, each of which is provided between an optical line and a radio line, for transmitting an optical signal received from the optical line to the radio line and transmitting a signal received from the radio line to the optical line, a setting unit, which is provided to be shared by each channel board, for attaching, per channel board, priority value to clock contained in each signal sent in via an optical line and a radio line, and for setting, per channel board, whether the clock of each priority value is to be outputted or not, and an equipment-clock decision unit for deciding a clock shared by the entire apparatus. Each channel board enters a clock, whose output has been designated by the setting unit, as well as the priority value and quality value of the clock, into the equipment-clock decision unit. On the basis of the quality value and priority value of each clock entered from each channel board, the equipment-clock decision unit decides the equipment clock and enters the equipment clock into each channel board.

17 Claims, 34 Drawing Sheets

FIG.6

| FLAG | ADR | FNo. | DATA1 | DATA2 | DATA3 | DATA4 | CRC | SP |
|------|-----|------|-------|-------|-------|-------|-----|-----|

| | | | |
|---|---|---|---|
| FLAG | : | FLAG "01111110" | 8 bit |
| ADR | : | ADDRESS | 4 bit |
| FNo. | : | FRAME No. (0~15) | 4 bit |
| DATA1 | : | DATA 1 (SPARE 1) | 8 bit |
| DATA2 | : | DATA 2 (SPARE 2) | 8 bit |
| DATA3 | : | DATA 3 (SPARE 3) | 8 bit |
| DATA4 | : | DATA 4 (LINE SWITCHING INFORMATION) | 8 bit |
| CRC | : | Cyclic Redundancy Check | 6 bit |
| SP | : | STOP CODE "00" | 2 bit |

FIG. 25 (PRIOR ART)

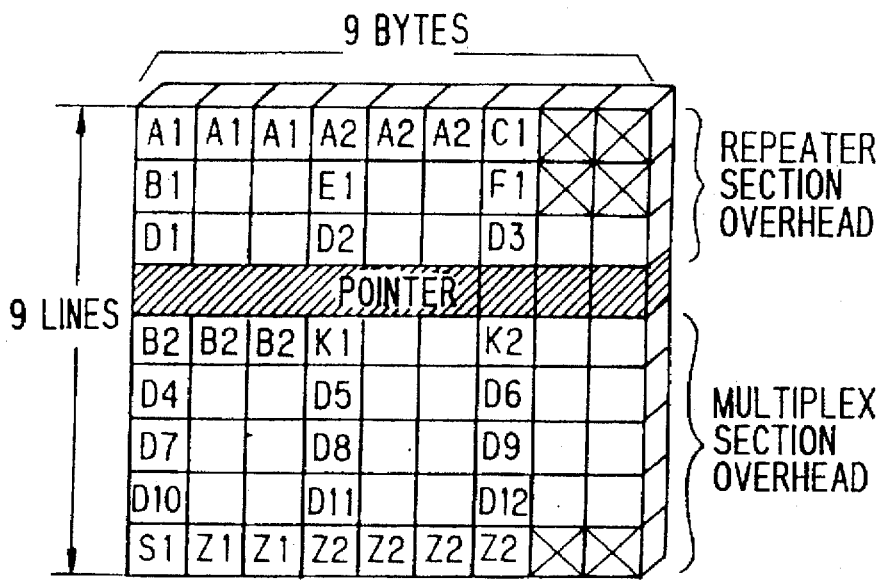

FIG. 26 (PRIOR ART)

| | SYMBOL | USE IN NNI |
|---|---|---|
| REPEATER SECTION OVERHEAD | A1, A2 | FRAME SYNCHRONISM |
| | C1 | IDENTIFICATION NUMBER OF EACH STM-1 IN STM-N |
| | B1 | ERROR MONITORING IN REPEATER SECTION |
| | E1 | AUDIO ARRANGEMENTS IN REPEATER SECTION |
| | F1 | MALFUNCTION SPECIFICATION IN REPEATER SECTION |
| | D1~D3 | DATA COMMUNICATION IN REPEATER SECTION |
| MULTIPLEX SECTION OVERHEAD | B2 | SECTION ERROR MONITORING |
| | K1 | CONTROL OF CHANGEOVER SYSTEM |
| | K2 | TRANSFER OF MULTIPLEX SECTION STATUS |
| | D4~D12 | DATA COMMUNICATION IN MULTIPLEX SECTION |
| | S1 | QUALITY OF CLOCK |
| | Z1 | MULTIPLEX STANDBY |
| | Z2 | NOTIFICATION OF MULTIPLEX ERROR STATUS |
| | B2 | AUDIO ARRANGEMENTS IN MULTIPLEX SECTION |

FIG.29

| S1 BYTE (b5~b8) | SDH SYNCHRONOUS QUALITY LEVEL (Q) |
|---|---|
| 0 0 0 0 | Q=0 QUALITY UNKNOWN |
| 0 0 0 1 | Q=1 RESERVE |
| 0 0 1 0 | Q=2 G.811 |
| 0 0 1 1 | Q=3 G.812 |
| 0 1 0 0 | Q=4 RESERVE |
| 0 1 0 1 | Q=5 INTERNAL MODE |
| ⋮ | |
| 1 1 1 1 | Q=F  Don't use for sync |

FIG. 34

| PRIORITY | VALUE OF ADDRESS |
|---|---|
| PR1 | X001 |
| PR2 | X010 |
| PR3 | X100 |

FIG. 35

| ADDRESS/DATA BUS | SEND/RECEIVE | MEANING |
|---|---|---|
| 0001 | RECEIVE | RECEIVE SSMB FROM CH BOARD OF PRIORITY 1 |
| 0010 | RECEIVE | RECEIVE SSMB FROM CH BOARD OF PRIORITY 2 |
| 0100 | RECEIVE | RECEIVE SSMB FROM CH BOARD OF PRIORITY 3 |
| 1001 | SEND | SEND SSMB OF CLOCK SOURCE OF PRIORITY 1 |
| 1010 | SEND | SEND SSMB OF CLOCK SOURCE OF PRIORITY 2 |
| 1100 | SEND | SEND SSMB OF CLOCK SOURCE OF PRIORITY 3 |
| 1000 | SEND | SEND SSMB (CORRESPONDS TO Q=5) OF EQUIPMENT CLOCK |

RADIO APPARATUS

BACKGROUND OF THE INVENTION

This invention relates to a radio apparatus in a synchronous digital hierarchy (SDH) network. More particularly, the invention relates to a radio apparatus in an SDH network in which a radio transmission line is installed between optical transmission lines each having a plurality of optical lines.

(a) SDH Frame

The world-wide trend toward the adoption of the SDH scheme for networks in optical transmission is continuing. FIG. 23 is a diagram for describing the structure of a frame in SDH. This is for a transmission rate of 155.52 Mbps. One frame is composed of 9×270 bytes. The first 9×9 bytes constitute section overhead (SOH), and the remaining bytes constitute path overhead (POH) and payload (PL).

The section overhead SOH is a section which transmits information (a frame synchronizing signal) representing the beginning of the frame, information specific to the transmission line (namely information which checks for error at transmission time, information for network maintenance, etc.) and a pointer indicating the position of the path overhead POH. Path overhead POH is a section which transmits end-to-end monitoring information within a network. The payload PL is a section which transmits 150 Mbps information.

The section overhead SOH is composed of repeater section overhead of 3×9 bytes, a pointer of 1×9 bytes and multiplex section overhead of 5×9 bytes. As shown in FIG. 24, the multiplex section is the section between terminal repeater units 1, 2. In a case where a number of transmission lines $3a$~$3c$ and repeaters $4a$, $4c$ are provided between the terminal repeater units 1, 2, the repeater section is the section between both ends of one transmission line, and the multiplex section is composed of a plurality of repeater sections.

As shown in FIG. 25, the repeater section overhead has bytes A1~A2, C1, B1, E1, F1, D1~D3, and the multiplex section overhead has bytes B2, K1~K2, D4~D12, S1, Z1~Z2. The meaning of each byte is illustrated in FIG. 26. The repeater section overhead transmits frame synchronizing signals (bytes A1, A2), an error monitoring signal (byte B1) for monitoring error in the repeater section, a fault specifying signal (byte F1) for specifying a fault in the repeater section, etc. The multiplex section overhead transmits an error monitoring signal (byte B2) for monitoring error in the section, a changeover signal (byte K1) for switching between a standby system and a working system, a transfer signal (byte K2) for transferring the status in the multiplex section and the quality (S1 byte) of a clock. The repeater section overhead and multiplex section overhead have a number of undefined bytes. Use of these bytes is left to the communications manufacturer concerned.

(b) SDH Network

An SDH frame is thus constructed and application of SDH to networks is progressing mainly in optical transmission. There are cases in which such an SDH network incorporates a radio transmission line. For example, in a case where an SDH network is constructed across the ocean or across steep mountainous areas, an optical cable must be laid on the ocean floor or across mountainous terrain. However, the work for laying such cables is a major undertaking and requires great expenditures. When an SDH network is constructed in areas where the laying of cable is difficult, as in the case of the ocean floor or steep mountain ranges, an optical transmission line is laid as far as the entrance to the area, an optical transmission line is laid from the exit of the area and a radio transmission line is introduced between these two optical transmission lines.

FIG. 27 illustrates an example of the arrangement of an SDH network in which a radio transmission line is introduced into an optical transmission line. In this case transmission is performed while terminating the redundant lines of the optical transmission line. The network includes optical transmission units $11a$, $11b$ and radio units $12a$, $12b$. Optical transmission lines $13_{1W}$~$13_{2P}$ are laid between the optical transmission unit $11a$ and the radio unit $12a$. The optical transmission lines $13_{1W}$, $13_{2W}$ are working lines, and the optical transmission lines $13_{1P}$, $13_{2P}$ are protection (i.e., standby) lines. The protection lines $13_{1P}$, $13_{2P}$ become the working lines when failures develop in the working lines $13_{1W}$, $13_{2W}$, respectively. Identical data is transmitted on the working lines and protection lines.

Numerals $14_{1W}$, $14_{2W}$ denote radio working lines provided to correspond to the optical working lines $13_{1W}$, $13_{2W}$, respectively. Numeral $14_P$ represents one radio protection line. The radio unit $12a$ terminates the optical protection lines and transmits data from the optical working lines $13_{1W}$, $13_{2W}$ to the opposing radio unit $12b$ via the radio working lines $14_{1W}$, $14_{2W}$. Further, when a fault has developed in one of the radio working lines $14_{1W}$, $14_{2W}$, the radio unit $12a$ transmits data, which has been accepted from the corresponding optical working line, to the radio unit $12b$ via the radio protection line $14_P$, thereby relieving the failed radio working line.

Optical transmission lines $15_{1W}$~$15_{2P}$ are laid between the radio unit $12b$ and the optical transmission unit $11b$. The optical transmission lines $15_{1W}$, $15_{2W}$ are working lines, and the optical transmission lines $15_{1P}$, $15_{2P}$ are protection lines. The protection lines $15_{1P}$, $15_{2P}$ become the working lines when failures develop in the working lines $15_{1W}$, $15_{2W}$, respectively. The radio unit $12b$ sends the optical working line $15_{1W}$ and the optical protection line $15_{1P}$ data accepted from the first radio working line $14_{1W}$ or radio protection line $14_P$ (at the time of failure), and sends the optical working line $15_{2W}$ and the optical protection line $15_{2P}$ data accepted from the second radio working line $14_{2W}$ or radio protection line $14_P$ (at the time of failure). As a result, identical data is transmitted to the optical working lines and optical protection lines.

In FIG. 27, an optical working line and an optical protection line form a pair, at two of such pairs are provided. However, N ($\geq 2$) pairs are provided ordinarily. More specifically, the optical lines consists of N pairs of optical working lines and optical protection lines. The radio lines have radio working lines corresponding to the N-number of optical working lines as well as one radio protection line.

(c) Construction of Synchronous Network and Selection of Clock (c-1) Configuration In order to construct a synchronous network in an SDH network, a master (G.811) is used as a synchronizing source (clock source), and slaves (G.812) synchronized to the master are placed at appropriate locations. Each slave absorbs phase delay (jitter) exhibited by the clock outputted by the master and reproduces a clock that is free of phase delay.

FIG. 28 is a diagram showing the relationship among transmission units, a master and a slave. Specifically, NE1~NE5 denote transmission units (optical transmission units and radio transmission units), MS a master and SL a slave. CEX represents a clock extraction unit.

Each transmission unit NEi (i=1~5) compares the quality (S1 byte) of a clock extracted from a main signal in the outgoing (GO) direction with that of a clock extracted from a main signal in the return (RTN) direction and effects synchronization to the clock having the higher quality. Further, each transmission unit inserts "Don't use for sync" (Q=F), as an S1 byte, in a main signal sent in a direction opposite the direction of arrival of the main signal from which the clock has been extracted. The transmission unit NE1 is synchronized solely to the clock signal from the master M, and the transmission unit NE4 delivers the clock signal, which has been extracted from the main signal, to the slave SL and is synchronized solely to the clock signal from the slave SL.

FIG. 29 is a diagram for describing the quality levels of the master and slave. The quality levels of clocks outputted by master G.811 and slave G.812 are 2 and 3, respectively, the quality level of an internal clock is 5, and the quality level of a clock that is unusable ("Don't use for sync") as a synchronizing signal is a minimum level F. "Don't use for sync" is a designation according to which a signal path using identical clocks will not form a loop. This is stipulated by international standards. More specifically, when the same clock is used as a synchronizing clock in signal transmission in the outgoing/return directions (GO/RTN directions) and the path of a signal using this clock forms a loop, synchronism in the network is disturbed. Consequently, the fact that the signal is not used as a synchronizing signal is designated by G=F so that the loop will not be formed.

(c-2) Clock selection operation

The transmission unit NE1 sends data in the outgoing direction (GO direction) in synchronization solely with the clock signal from the master MS and makes the quality level Q equal to 2 (Q=2).

The transmission unit NE2 compares the quality of the clock in the GO direction and the quality of the clock in the RTN direction, extracts the clock from the main signal, in the GO direction, having the higher quality, transmits data in the GO direction in synchronization with this clock and makes the quality level equal to 2 (Q=2). Further, the transmission unit NE2 sends data in the RTN direction in synchronization with this clock and makes the quality level equal to F (Q=F; "Don't use for sync").

The transmission unit NE3 compares the quality of the clock (Q=2) in the GO direction and the quality of the clock (Q=3) in the RTN direction, extracts the clock from the main signal, in the GO direction, having the higher quality, transmits data in the GO direction in synchronization with this clock and makes the quality level equal to 2 (Q=2). Further, the transmission unit NE3 sends data in the RTN direction in synchronization with this clock and makes the quality level equal to F (Q=F; "Don't use for sync").

The transmission unit NE4 delivers the clock, extracted from the main signal having the higher quality, to the slave SL, the slave SL reproduces a new clock based upon the extracted clock and enters the new clock into the transmission unit NE4. The transmission unit NE4 sends the data in the GO direction in synchronization solely with the clock signal from the slave SL and makes the quality level equal to 3 (Q=3). Further, the transmission unit NE4 sends data in the RTN direction in synchronization with this clock and makes the quality level equal to 3 (Q=3).

The transmission unit NE5 compares the quality of the clock in the GO direction and the quality of the clock in the RTN direction, extracts the clock from the main signal, in the GO direction, having the higher quality, transmits data in the GO direction in synchronization with this clock and makes the quality level equal to 3 (Q=3). Further, the transmission unit NE5 sends data in the RTN direction in synchronization with this clock and makes the quality level equal to F (Q=F; "Don't use for sync").

Similarly, though not shown, slaves are likewise placed at appropriate locations and clocks are selected in such a manner that a loop of identical clocks will not be formed, thereby maintaining the synchronization of the network.

(c-3) Clock selection operation when master fails

FIG. 30 is a diagram for describing the clock selection operation when the master fails. When a fault develops in the master MS, the transmission unit NE1 makes a transition to a holdover state or to an internal mode, sends the data in the GO direction in synchronization with an internal clock and makes the quality level equal to 5 (Q=5).

The transmission unit NE2 compares the quality of the clock (Q=5) in the GO direction and the quality of the clock (Q=3) in the RTN direction, extracts the clock from the main signal, in the RTN direction, having the higher quality, transmits data in the GO direction in synchronization with this clock and makes the quality level equal to F (Q=F; "Don't use for sync"). Further, the transmission unit NE2 sends data in the RTN direction in synchronization with this clock and makes the quality level equal to 3 (Q=3).

The transmission unit NE3 compares the quality of the clock (Q=F) in the GO direction and the quality of the clock (Q=3) in the RTN direction, extracts the clock from the main signal, in the RTN direction, having the higher quality, transmits data in the GO direction in synchronization with this clock and makes the quality level equal to F (Q=F). Further, the transmission unit NE2 sends data in the RTN direction in synchronization with this clock and makes the quality level equal to 3 (Q=3).

The transmission unit NE4 cuts off the input of the clock to the slave SL owing to the decline in the quality of the clock contained in the main signal. As a result, the slave SL provides the transmission unit NE4 with a clock generated from an internal reference clock source. The transmission unit NE4 sends the data in the GO direction in synchronization solely with the clock signal from the slave SL and makes the quality level equal to 3 (Q=3). Further, the transmission unit NE4 sends the data in the RTN direction in synchronization with this clock and makes the quality level equal to 3 (Q=3).

The transmission unit NE5 compares the quality of the clock in the GO direction and the quality of the clock in the RTN direction, extracts the clock from the main signal, in the GO direction, having the higher quality, transmits data in the GO direction in synchronization with this clock and makes the quality level equal to 3 (Q=3). Further, the transmission unit NE5 sends data in the RTN direction in synchronization with this clock and makes the quality level equal to F (Q=F; "Don't use for sync").

Similarly, though not shown, slaves are likewise placed at appropriate locations and clocks are selected in such a manner that a loop of an identical clock will not be formed, thereby maintaining the synchronization of the network.

(d) Clock Selection Method in Radio Unit

FIGS. 31 and 32 are diagrams for describing clock selection in a channel board (CH board) constituting a radio unit, in which FIG. 31 is shows the arrangement of principal elements on the channel board and FIG. 32 illustrates the connection relationship between the channel boards of N-number of channels and a timing control unit TCU.

Illustrated in FIG. 31 are an interface (optical working interface) 21 of optical working lines, an interface (optical protection interface) 22 of optical protection lines, a clock output unit 23 for outputting clocks designated according to order of priority, a monitoring control console (LT) 24 for making entries such as order of priority of a clock and whether the clock is outputted or not, a microprocessor (MPU) 25 for controlling the clock output 23 based upon setting information entered from the monitoring control console 24, a selector 26 for selecting a signal outputted by the optical working interface 21 or a signal outputted by the optical protection interface 22 and entering the selected signal into the radio transmission section, and a distributor 27 for distributing signals, which have entered from the radio transmission section, to the optical working interface 21 and optical protection interface 22.

Clock extractors 21a, 22a respectively extract a clock CL1 contained in a main signal on an optical working line in the GO direction and a clock CL2 contained in a main signal on an optical protection line in the GO direction, and clock extractors 21b, 22b respectively extract a clock CL3 contained in a radio reception signal in the RTN direction and a clock CL4 contained in a main signal on an optical protection line in the RTN direction. High-impedance units 23a~23c transmit/block a clock by high-impedance control in accordance with a command from the MPU 25. The high-impedance unit 23a, 23b and 23c control transmission/ blockage of clocks having first priority, second priority and third priority, respectively.

The monitoring control console 24 (1) attaches priority values PR1, PR2, PR3 to the clock CL1 contained in the signal on the optical working line in the GO direction, the clock CL2 contained in the signal on the optical protection line in the GO direction and the clock CL3 contained in the radio reception signal in the RTN direction, respectively, and (2) sets whether the clock of priority value PR1 is to be outputted, whether the clock of priority value PR2 is to be outputted or whether the clock of priority value PR3 is to be outputted. More specifically, the monitoring control console 24 attaches the first priority value PR1 to the clock among the clocks CL1~CL4 that has the highest priority, and attaches the second and third priority values PR2, PR3 to the clock having the second and third highest priority values. Further, the monitoring control console 24 performs a setting in such a manner that the clock having the highest quality is outputted from among N-number of first-priority clocks of N channels, performs a setting in such a manner that the clock having the highest quality is outputted from among N-number of second-priority clocks of N channels and performs a setting in such a manner that the clock having the highest quality is outputted from among N-number of third priority clocks of N channels.

For example, if the monitoring control console 24 attaches the first priority value PR1, the second priority value PR2 and the third priority value PR3 to the clocks CL1, CL2 and CL3, respectively, and executes a setting in such a manner that all of these clocks are outputted, the MPU 25 enters this setting information into the each of the high-impedance controllers 23a~23c. The high-impedance controllers 23a, 23b and 23c output the clock signals CL1, CL2 and CL3 of the first, second and third priority values PR1, PR2 and PR3, respectively, to output lines L1, L2 and L3, respectively. Further, if the monitoring control console 24 executes a setting in such a manner that only the clock CL1 of the first priority value PR1 is outputted, the high-impedance controller 23a outputs the clock CL1 of the first priority value PR1 to the output line L1 but the other high-impedance controllers 23b, 23c do not output the clocks CL2, CL3 of the second and third priority values PR2, PR3 to the output lines L2, L3, respectively. If the monitoring control console 24 performs a setting in such a manner that no clock is outputted, irrespective of priority value, then none of the high-impedance controllers 23a~23c send clocks to the output lines.

The channel boards of N-number of channels all having the construction shown in FIG. 31, independently set priority values for each of the clocks and execute settings in such a manner that clocks having the priority values are or are not outputted.

FIG. 32 is a diagram showing the connection relationship among the channel boards of N-number of channels. Numerals $12a_1$~$12a_N$ denote channel boards for N-number of channels in a radio apparatus, and numeral 12c denotes a timing control unit (TCU), which is shared by the channel boards. On the basis of the qualities and priority values of clocks, TCU 12c decides the clocks used by the radio apparatus (each of the channel boards). Numeral 12d denotes a pull-up unit.

Corresponding ones of the clock output lines L1~L3 of the channel boards $12a_1$~$12a_N$ are connected together and all are connected to the shared timing control unit (TCU) 12c in order to reduce the number of connecting lines between frames and between shelves. The clock having the first priority value PR1 is outputted to the output line L1 solely from a prescribed channel board among the channel boards $12a_1$~$12a_N$. Similarly, the clocks having the second and third priority values PR2 and PR3 are outputted to the output lines L2 and L3, respectively, only from prescribed channel boards. These clocks enter the TCU 12c. The line L4 is for entering an equipment clock (system clock) EC, which has been decided by the TCU 12c, into each of the channel boards $12a_1$~$12a_N$. The line L5 is an SSMB transmission bus for transmitting an SSMB (the S1 byte indicating quality).

The SSMB transmission bus L5 is constituted by four lines, namely a transmission clock line, an address/data bus, an address enable line and a data enable line. FIG. 33 is a time chart of signals on each of the lines making up the SSMB transmission bus.

The transmission clock, which is a clock signal for sending and receiving address/data, address enable and data enable, is outputted from the clock source serving as the master. The address enable signal is an enable signal (active at logical level "L") indicating whether data on the address/ data bus is an address value. The data enable signal is an enable signal (active at logical level "L") indicating whether data on the address/data bus is an SSMB data value. The address/data indicates address values and SSMB data values that represent the priority values PR1~PR3. The address values and SSMB data values are transmitted alternately, each transmission consisting of four bits.

FIG. 34 is a correspondence table showing the correspondence between priority values and address values. The address values of the first, second and third priority values PR1, PR2 and PR3, respectively, are X001, X010 and X100, respectively. The most significant bit of an address value is used to indicate the transmission direction of the SSMB data on the address/data bus. More specifically, (1) when the most significant bit of an address is "0", each channel board outputs the quality of the clock, and (2) when the most significant bit of an address is "1", the TCU outputs the quality of the equipment clock EC.

A channel board which outputs the clock having the first priority value PR1 sends the quality (SSMB data) of this clock to the TCU 12c via the SSMB transmission bus L5. A channel board which outputs the clock having the second priority value PR2 sends the quality (SSMB data) of this clock to the TCU 12c via the SSMB transmission bus L5. Similarly, a channel board which outputs the clock having the third priority value PR3 sends the quality (SSMB data) of this clock to the TCU 12c via the SSMB transmission bus L5. Further, from the three entered clock signals ①, ②, ③ having the first, second and third priorities, and on the basis of respective qualities and priority values, the TCU 12c decides the equipment clock EC used by all of the channel boards and sends the decided equipment clock EC to all channel boards via the line L4. Further, the TCU 12c enters the quality (SSMB data) of the equipment clock EC and clock-source selection information (priority value: address value), which is for preventing the looping of a clock, into all of the channel boards via the SSMB transmission bus L5. The procedure for deciding the equipment clock EC includes obtaining the clock having the highest quality and, if there are two or more clocks having the highest quality, deciding upon the clock having the highest priority value as the equipment clock EC.

FIG. 35 is a diagram for describing the meaning of the address values and of the SSMB data sent immediately after the address values. At the time of holdover, the address value is made "1000" and the SSMB data (which corresponds to "1011" quality level 5) is outputted when the internal clock is selected.

Thus, all of the channel boards have the construction shown in FIG. 31, the network administrator or serviceman uses each of the monitoring control consoles to set the priority values and makes a setting to output or not output the clock having each priority value. However, since settings are made individually for each channel board, there are cases where redundant entries are made inadvertently, namely cases in which settings are made erroneously in such a manner that clocks having identical priority values are transmitted from two or more channel boards. In such cases a clock composed of a combination of two or more clocks finds itself being used as the synchronizing clock. As a consequence, the synchronous network is desynchronized and the result is system malfunction.

In a case where a clock contained in a radio reception signal is used as the clock source in a radio apparatus having interfaces for optical working lines and interfaces for optical protection lines, there are instances where the quality level Q=F ("Don't use for sync") cannot be added onto the data sent to the opposing radio apparatus. As a result, a clock loop is formed, synchronism breaks down and the result is system malfunction.

FIGS. 36 and 37 are diagrams for describing a case in which a clock loop is formed. FIG. 36 is a diagram for describing normal operation, and FIG. 37 is a diagram for describing a case in which a fault has developed in a master.

In FIGS. 36 and 37, NE1~NE4 denote the transmission units (optical transmission units and radio transmission units), MS the master and SL the slave. CEX, $CEX_W$, $CEX_P$ represent clock extractors for extracting clocks from main signals. Among the transmission units NE1~NE4, NE1 is an optical transmission unit having serving as both a working unit and a protection unit, NE2 is a radio unit having an optical working interface $OPI_W$, an optical protection interface $OPI_P$, a radio transmitter TX, a radio receiver RX, a selector SEL for selecting a signal from a working line or protection line and entering the signal into a radio transmission section, and a distributor DSTR for distributing a signal, which has entered from the radio transmission section, to the optical working/protection interfaces, and NE3 is a radio unit.

Each transmission unit NEi (i=1~4) compares the quality of a clock in the GO direction with that of a clock in the RTN and effects synchronization to the clock having the higher quality. Further, each transmission unit inserts "Don't use for sync" (Q=F), as an S1 byte, in a signal sent in a direction opposite the direction of arrival of the main signal from which the clock has been extracted. The optical transmission unit NE1 is synchronized solely to the clock signal from the master M, and the radio transmission unit NE3 delivers the clock, which has been extracted from the main signal, to the slave SL and is synchronized solely to the clock signal from the slave SL.

In FIG. 36, the transmission unit NE1 sends data to the optical working line and optical protection line in the GO direction in synchronization with the clock signal from the master MS and makes the quality level Q equal to 2 (Q=2). The radio unit NE2 compares the quality of the clock on the working/protection lines in the GO direction and the quality of the clock in the RTN direction, extracts the clock from the main signal, on the working line in the GO direction, having the higher quality, transmits data in the GO direction in synchronization with this clock and makes the quality level equal to 2 (Q=2). Further, the radio unit NE2 sends data to both the working/protection lines in the RTN direction in synchronization with this clock, makes the quality level of the working line equal to F (Q=F; "Don't use for sync") and makes the quality level of the protection line equal to 2 (Q=2). The working line and the protection line are separate. Therefore, in a case where the main signal from which a clock has been extracted is on the working line (or on the protection line), "Don't use for sync" (Q=2) is not inserted even if a signal is sent via the protection line (or via the working line) in the direction opposite that of the aforementioned main signal.

The radio unit NE3 delivers the clock, extracted from the main signal having the higher quality, to the slave SL, the slave SL reproduces a new clock based upon the extracted clock and enters the new clock into the transmission unit NE4. The transmission unit NE3 sends the data in the GO direction in synchronization solely with the clock signal from the slave SL and makes the quality level equal to 3 (Q=3). Further, the transmission unit NE3 sends data in the RTN direction in synchronization with this clock and makes the quality level equal to 3 (Q=3). The transmission unit NE4 compares the quality of the clock in the GO direction and the quality of the clock in the RTN direction, extracts the clock from the main signal, in the GO direction, having the higher quality, transmits data in the GO direction in synchronization with this clock and makes the quality level equal to 3 (Q=3). Further, the transmission unit NE4 sends data in the RTN direction in synchronization with this clock and makes the quality level equal to F (Q=F; "Don't use for sync").

Similarly, though not shown, slaves are likewise placed at appropriate locations and clocks are selected in such a manner that a loop of identical clocks will not be formed, thereby maintaining the synchronization of the network.

If a fault develops in the master MS under these conditions, as shown in FIG. 37, the optical transmission unit NE1 makes a transition to a holdover state or to an internal mode, sends the data in the GO direction in synchronization with an internal clock and makes the quality level equal to 5 (Q=5).

The transmission unit NE2 compares the quality of the clock (Q=5) in the GO direction and the quality of the clock (Q=3) in the RTN direction and extracts the clock from the main signal (radio reception signal), in the RTN direction, having the higher quality. It should be noted that the radio reception signal is distributed to the two optical interfaces, namely the optical working interface $OPI_P$ and the optical protection $OPI_W$, by the distributor DSTR, and it is assumed that the clock extracted from the clock extractor $CEX_P$ on the side of the optical protection line interface is used as the clock source.

The optical protection line interface $OPI_P$ sends the data in the protection GO direction in synchronization with the above-mentioned clock and makes the quality level equal to F (Q=F; "Don't use for sync"). Further, the optical protection line interface $OPI_P$ sends the data in the RTN direction in synchronization with the above-mentioned clock and makes the quality level equal to 3 (Q=3). On the other hand, the optical working line interface $OPI_W$ sends the data in the GO direction in synchronization with the extracted clock and makes the quality level equal to 3 (Q=3). Further, the optical protection line interface $OPI_W$ sends the data in the protection RTN direction in synchronization with the above-mentioned clock and makes the quality level equal to 3 (Q=3).

The selector SEL selects and outputs a signal that has entered from either the optical working interface or optical protection interface. If the signal that has entered from the optical protection interface $OPI_P$ is selected and outputted, the radio unit NE3 does not enter the clock into the slave SL because the quality of the main signal is poor (Q=F). The slave SL provides the transmission unit NE3 with a clock generated from an internal reference clock source. The transmission unit NE3 sends data in the GO direction in synchronization solely with clock signal from the slave SL and makes the quality level Q=3. Further, the transmission unit NE3 sends the data in the RTN direction in synchronization with the above-mentioned clock and makes the quality level Q=3. The transmission unit NE4 compares the quality of the clock in the GO direction and the quality of the clock in the RTN direction, extracts the clock from the main signal, in the GO direction, having the higher quality, transmits data in the GO direction in synchronization with this clock and makes the quality level equal to 3 (Q=3). Further, the transmission unit NE4 sends data in the RTN direction in synchronization with this clock and makes the quality level equal to F (Q=F; "Don't use for sync").

Thus, in a case where the selector SEL selects and outputs the signal that has entered from the optical protection line interface $OPI_P$, a clock loop is not formed and synchronization is not disturbed. However, in a case where the selector SEL selects and outputs the signal that has entered from the optical working line interface $OPI_W$, a clock loop is formed and synchronization is lost. More specifically, if the selector SEL selects and outputs the signal that has entered from the optical working interface $OPI_W$, the radio unit NE3 delivers the clock, which has been extracted from the main signal (Q=3) of higher quality, to the slave SL, and the slave SL reproduces a new clock based upon the above-mentioned clock and enters the new clock into the transmission unit NE3. As a result, a loop of the same clock is formed and synchronization is lost.

SUMMARY OF THE INVENTION

Accordingly, a first object of the present invention is to prevent clocks having the same priority value from being transmitted from two or more channel boards.

A second object of the present invention is to so arrange it that the path of a signal using identical clocks will not form a loop.

In accordance with the present invention, the first object is attained by providing a radio apparatus in a synchronous digital hierarchy (SDH) network in which a radio transmission line having a plurality of radio lines is installed between optical transmission lines each having a plurality of optical lines, comprising a plurality of channel board, each of which is provided between an optical line and a radio line, for transmitting an optical signal received from the optical line to the radio line and transmitting a signal received from the radio line to the optical line, a setting unit, which is provided to be shared by each channel board, for attaching, per channel board, priority value to clock contained in each signal sent in via an optical line and a radio line, and for setting, per channel board, whether the clock of each priority value is to be outputted or not, an equipment-clock decision unit for deciding a clock shared by the entire apparatus as an equipment clock, and a clock supply line, which is provided for each priority value, for connecting a clock output terminal for a prescribed priority value in each channel board and a clock input terminal for this priority value in the equipment-clock decision unit, and for entering a clock having this priority value into the equipment-clock decision unit from a prescribed channel board, wherein a channel board that has outputted a clock of prescribed priority value via the clock supply line extracts quality value data from a signal containing this clock and enters the quality value into the equipment-clock decision unit, and the equipment-clock decision unit decides an equipment clock based upon the quality value and priority value of each entered clock and enters the equipment clock into each channel board.

According to the present invention, the second object is attained by providing each channel board, which has an optical working interface corresponding to an optical working line and an optical protection interface corresponding to an optical protection line, with notification means which, if a clock contained in radio reception signal that has entered the optical protection interface becomes the equipment clock, so notifies the optical working interface, and if a clock contained in a radio reception signal that has entered the optical working interface becomes the equipment clock, so notifies the optical protection interface, wherein a quality insertion unit of the optical working interface that has received notification from the notification means attaches, to the signal outputted to the side of a radio line, a quality value Q=F indicating that a clock contained in this signal is not to be used as a synchronizing signal, and a quality insertion unit of the optical protection interface that has received notification from the notification means attaches, to the signal outputted to the side of the radio line, the quality value Q=F.

Other features and advantages of the present invention will be apparent from the following description taken in conjunction with the accompanying drawings.

BRIEF DESCRIPTION OF THE DRAWINGS

FIG. 6 is a diagram for describing frame format at the time of a serial transmission;

FIG. 25 is a diagram for describing section overhead according to the prior art;

FIG. 26 shows the meaning of each byte in section overhead according to the prior art;

FIG. 29 is a table for describing quality levels;

FIG. 34 is a diagram for describing the correspondence between priority values and address values;

FIG. 35 is a table showing address/data and the meanings thereof;

DESCRIPTION OF THE PREFERRED EMBODIMENTS

(A) OVERVIEW OF THE INVENTION (a) Overview of First Aspect of the Invention

Figure 1:
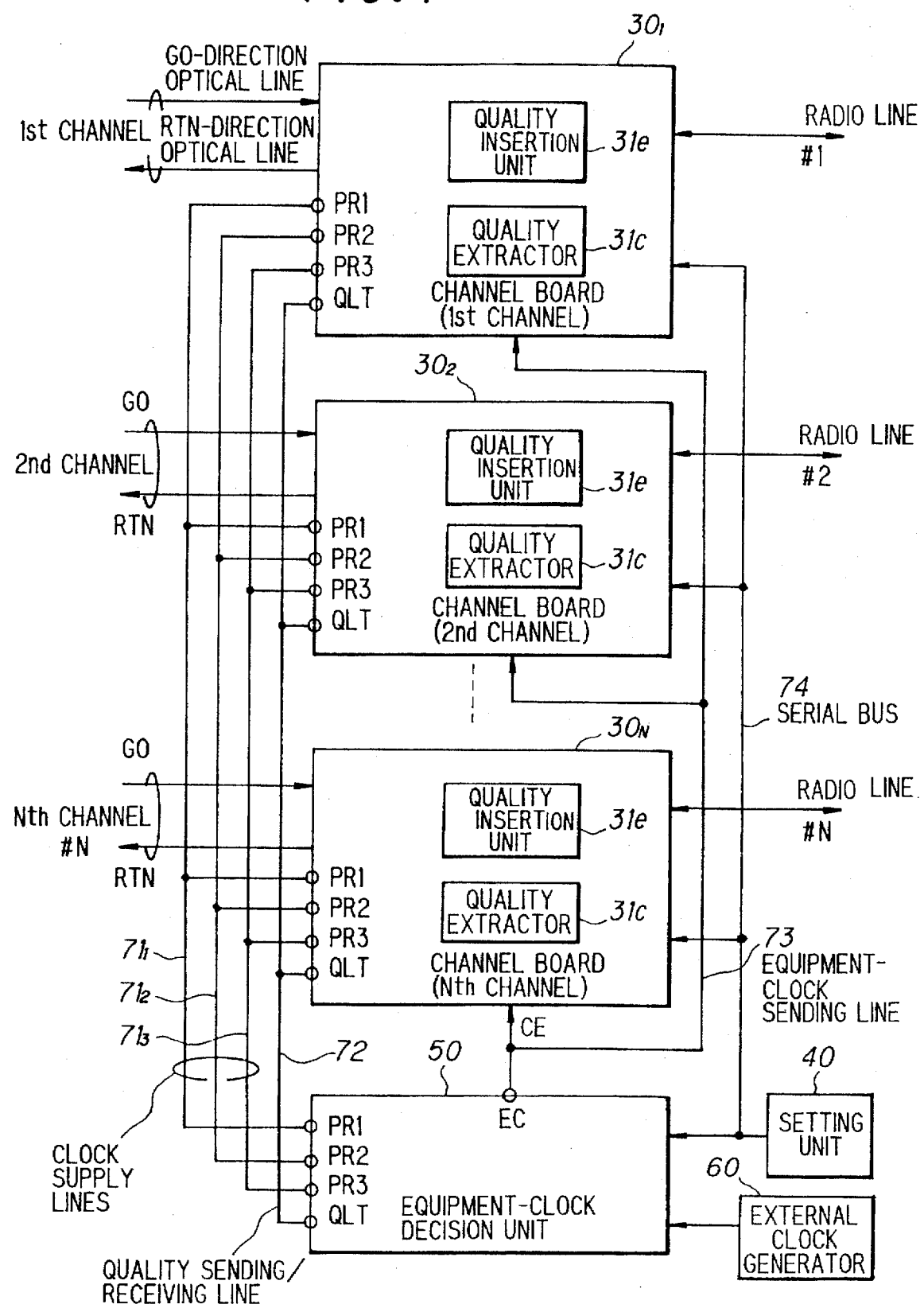
FIG. 1 is a diagram for describing the overview of a first aspect of the present invention.

FIG. 1, which is a diagram for describing a first aspect of the present invention, illustrates the overall construction of a radio apparatus. The apparatus includes channel boards (CH) $30_1 \sim 30_N$, which are provided to correspond to 1st through Nth channels, for transmitting optical signals received from optical lines to radio lines and transmitting signals received from radio lines to optical lines; a setting unit 40, which is provided to be shared by each channel board, for attaching, per channel board, priority values (PR1~PR3) to clocks contained in signals sent in via optical lines and radio lines, and for setting whether the clock of each priority value is outputted or not; an equipment-clock decision unit 50 for deciding a clock EC shared by the entire apparatus; an external clock generator 60; and clock supply lines $71_1 \sim 71_3$, which are provided for respective ones of the priority values (PR1~PR3), for entering clocks having respective priority values PR1~PR3 into the equipment-clock decision unit 50 from a prescribed channel board. Numeral 72 denotes a quality sending/receiving line connecting a quality sending/receiving terminal QLT of each of the channel boards $30_1 \sim 30_N$ and a quality sending/receiving terminal QLT of the equipment-clock decision unit 50. Numeral 73 denotes an equipment-clock sending line for sending the equipment clock EC decided by the equipment-clock decision unit 50 to each of the channel boards $30_1 \sim 30_N$, and numeral 74 denotes a serial bus connecting the setting unit 40 an each of the channel boards $30_1 \sim 30_N$.

Each channel board has a quality extractor 31c for extracting quality data (the S1 byte of the overhead) from the signal received from each line, and a quality insertion unit 31e for inserting quality data (the S1 byte of the overhead) into a signal outputted to each line.

The setting unit 40 is provided to be shared by the channel boards $30_1 \sim 30_N$ (FIG. 1). For each channel board, the setting unit (1) attaches priority values to clocks contained in the signals sent in via the optical and radio lines, (2) sets whether clocks having respective priority values are to be sent to the equipment-clock decision unit via the clock supply lines $71_1 \sim 71_3$, and (3) sends this setting information to each channel board via the serial line 74. In a case where the sending of a clock having a prescribed priority value has been designated, each channel board $30_1 \sim 30_N$ sends the clock to respective one of the clock supply lines $71_1 \sim 71_3$ corresponding to the priority values; otherwise, no clocks are sent to the clock supply lines $71_1 \sim 71_3$. On the basis of the quality value and priority value of a clock that has entered via the clock supply line, the equipment-clock decision unit 50 decides the equipment clock EC and enters the clock EC into each of the channel boards via the equipment-clock sending line 73.

Thus, the setting unit 40 is provided so as to be shared by each of the channel boards $30_1 \sim 30_N$, and the setting unit 40 sets, in centralized fashion, the priority values of the clocks in the channel boards and whether a clock is to be outputted or blocked. As a result, settings can be made without error. In particular, it is possible to prevent a situation in which the synchronous network is desynchronized owing to output of two or more clocks on one clock supply line as the result of double entry of the same clock.

The quality extractor 31c of a channel board instructed to send a clock having a prescribed priority value extracts the quality (the S1 byte of the overhead) of this clock from the main signal received from the line. Next, the channel board enters this quality data, along with the priority value of the clock, into the equipment-clock decision unit 50 via the quality sending/receiving line. On the basis of the priority value and quality value received via the line 72, equipment-clock decision unit 50 decides the equipment clock EC from the clock entering via the clock supply line. For example, from clocks of respective priority values, the equipment-clock decision unit 50 obtains the clock having the highest quality. If two or more clocks of highest quality exist, the unit 50 decides upon the clock having the higher priority as the equipment clock. As a result, the clock having the highest quality can be decided as the equipment clock.

Besides a clock extracted from a line, an external clock is available as a candidate for the equipment clock. In a case where the setting unit 40 sets the priority value and quality value of the external clock, the equipment-clock decision unit 50 adopts the external clock as the clock having this priority value. Among the clocks of respective priority values, the equipment-clock decision unit 50 adopts the clock having the highest quality as the equipment clock and enters this clock into each of the channel boards. If this arrangement is adopted, the synchronous network can be enlarged by placing, at appropriate locations, external clock sources of high priority values and qualities, e.g., jitter-free clock sources (G.812) which absorb the jitter of the reference clock.

The quality insertion unit 31e of each of the channel boards $30_1 \sim 30_N$ attaches the quality value, which has entered from the equipment-clock decision unit 50, to (1) the main signal whose direction is the same as the direction of arrival of the clock serving as the equipment clock and (2) the main signal on the line other than that of the line on which the clock arrived, and (3) attaches the quality value (Q=F; "Don't use for sync"), which indicates that the clock is not used as the synchronizing signal, to the main signal on the same line but in the direction opposite that in which the clock arrived. If this arrangement is adopted, a clock loop will not be formed and the synchronous network will become desynchronized.

(b) Overview of Second Aspect of the Invention

Figure 2:
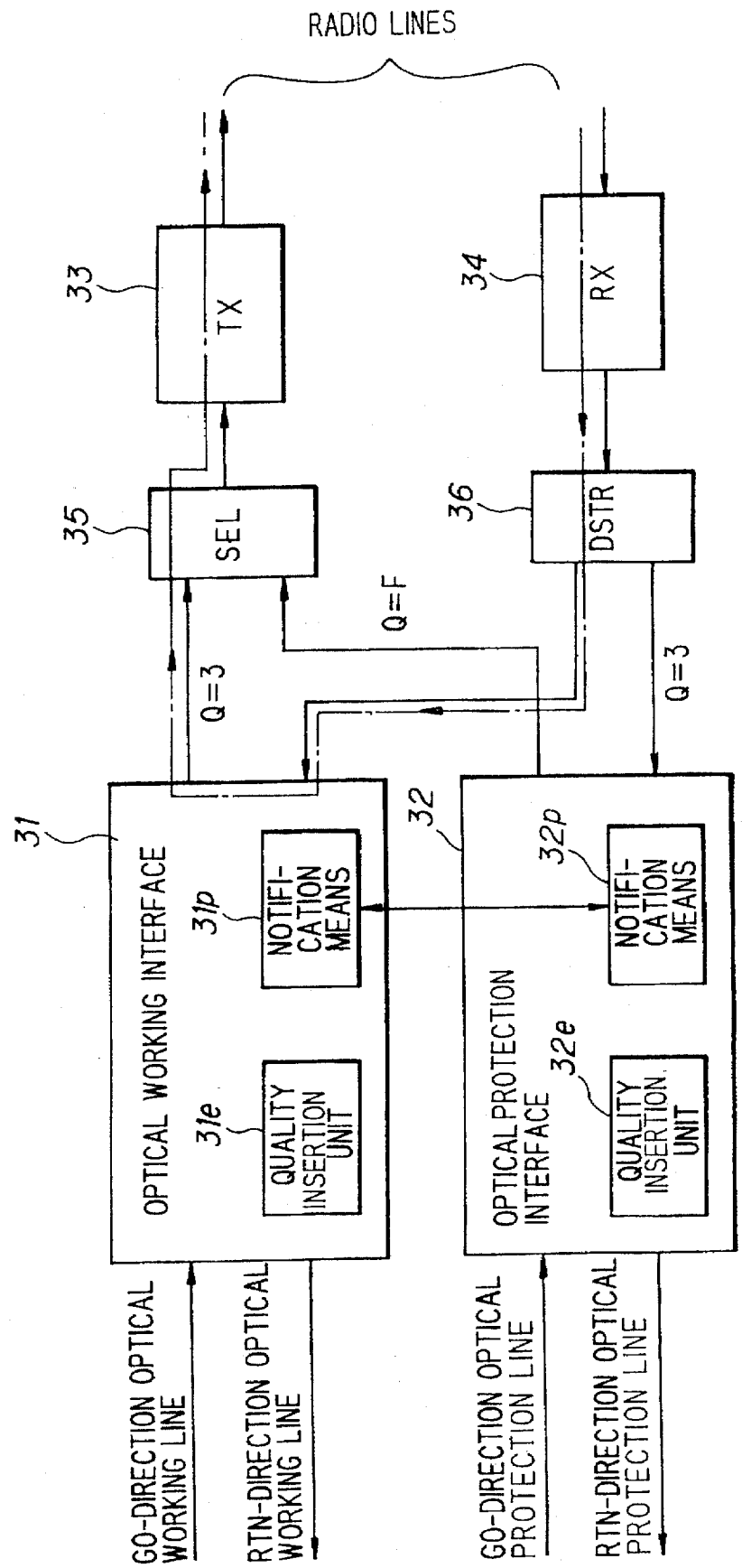
FIG. 2 is a diagram for describing the overview of a second aspect of the present invention.

FIG. 2, which is a diagram for describing a second aspect of the present invention, illustrates the construction of a channel board. The channel board includes an optical working interface 31 provided to correspond to an optical working line, an optical protection interface 32 provided to correspond to an optical protection line, a radio transmitter 33 for transmitting a signal, a radio receiver 34 for receiving a radio signal, a selector 35 for entering a signal, which has entered from the interface 31 or interface 32, into the radio transmitter 33, a distributor 36 for distributing a radio reception signal, which has been outputted by the radio receiver, to both interfaces, quality insertion units 31e, 32e, notification means 31p which, if a clock contained in the radio reception signal that has entered the optical working interface becomes the equipment clock, so notifies the optical protection interface, and notification means 32p which, if a clock contained in the radio reception signal that has entered the optical protection interface becomes the equipment clock, so notifies the optical working interface.

The working line and the protection line are regarded as separate lines and the quality of the equipment clock is attached irrespective of the direction in which a signal is sent. For example, if the clock (Q=3) of the radio reception signal that has entered the optical protection interface 32 becomes the equipment clock, the quality of the signal sent from the optical protection interface 32 to the side of the radio line is Q=F. However, the quality contained in the signal outputted from the optical working interface 31 to the side of the radio line is Q=3. When the signal outputted by the optical working interface 31 is sent to the opposing radio apparatus via the selector 35 and transmitter 33 (see the dot-and-dash line in FIG. 2), there is the possibility that a loop of identical clocks will be formed. Accordingly, in a case where the clock contained in the radio reception signal that has entered the optical protection interface 32 becomes the equipment clock, the notification means 32p so notifies the optical working interface 31 and, in response, the quality insertion unit 31e of the optical working interface 31 makes the quality Q of the signal outputted to the side of the radio line equal to F (Q=F). Similarly, in a case where the clock contained in the radio reception signal that has entered the optical working interface 31 becomes the equipment clock, the notification means 31p so notifies the optical protection interface 32. If this arrangement is adopted, a signal path using identical clocks will not form a loop.

(c) Overview of Third Aspect of the Invention

Figure 3:
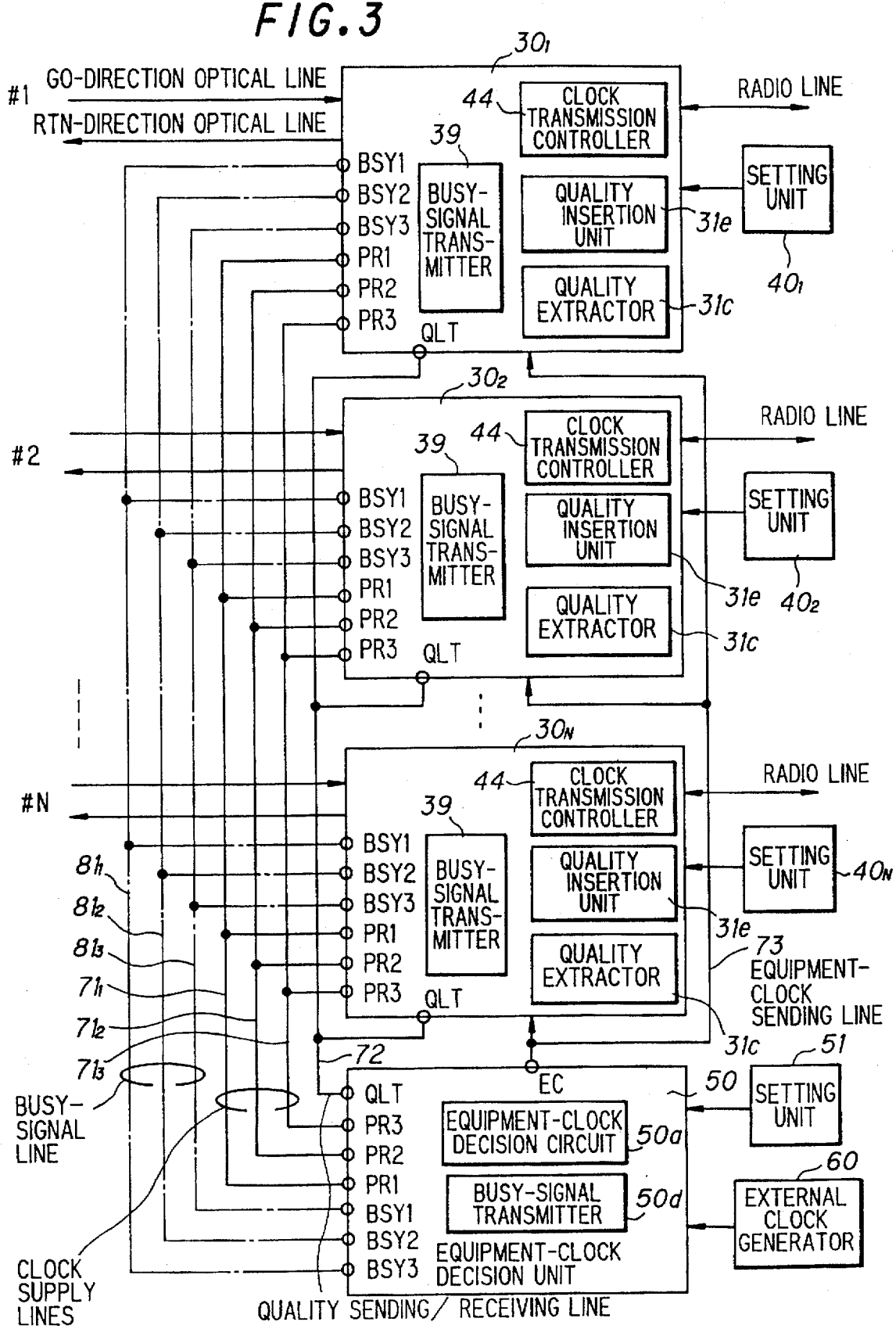
FIG. 3 is a diagram for describing the overview of a third aspect of the present invention.

FIG. 3, which is a diagram for describing a third aspect of the present invention, illustrates the overall construction of a radio apparatus. The apparatus includes the channel boards (CH) $30_1 \sim 30_N$, which are provided to correspond to 1st through Nth channels; setting units $40_1 \sim 40_N$, which are provided to correspond to respective ones of the channel boards $30_1 \sim 30_N$, for attaching priority values (PR1~PR3) to clocks contained in signals sent in via the optical lines and radio line of the corresponding channel board, and for setting whether the clock of each priority value is outputted or not; the equipment-clock decision unit 50 for deciding a clock EC shared by the entire apparatus; the external clock generator 60; a setting unit 51 for the equipment-clock decision unit 50; the clock supply lines $71_1 \sim 71_3$, which are provided for respective ones of the priority values (PR1~PR3); the quality sending/receiving line 72; the equipment-clock sending line 73; and busy-signal lines $81_1 \sim 81_3$ provided for respective ones of the priority values. The busy-signal lines $81_1 \sim 81_3$ send busy signals by which a channel board notifies other channel boards of the fact that output clocks having prescribed priority values have been designated.

Each channel board has the quality extractor 31c, the quality insertion unit 31e, and a clock transmission controller 44 which, when output of a clock having a prescribed priority value has been designated by the setting unit 40 i (i=1~N), outputs the clock if a busy signal corresponding to this priority value has not entered and inhibits output of the clock if the busy signal has entered. Each channel board further includes a busy-signal transmitter 39 which, if clocks having prescribed priority values are sent to the equipment-clock decision unit 50 via the clock supply lines $71_1 \sim 71_3$, sends busy signals corresponding to these priority values to the busy-signal lines $81_1 \sim 81_3$.

The equipment-clock decision unit 50 includes an equipment-clock decision circuit 50a for deciding the equipment clock based upon the quality and priority value of the clock that has entered from a channel board and the externally entered clock, and a busy-signal transmitter 50d for sending a busy signal to a busy-signal line that corresponds to the priority value of the external clock.

The setting units $40_1$~$40_N$, which are provided to correspond to respective ones of the channel boards $30_1$~$30_N$, attach priority values to clocks of the corresponding channel boards and set whether the clocks of the priority values are outputted to the equipment-clock decision unit 50 via the clock supply lines $71_1$~$71_3$. When output of clocks having prescribed priority values have been designated, the clock transmission controller 44 of the channel board checks the levels of busy-signal lines $81_1$~$81_3$ conforming to these priority values, sends the clocks to the clock supply lines if there are no busy signals and inhibits output of the clocks if there are busy signals. Further, in a case where clocks having prescribed priority values are outputted to the clock supply lines $71_1$~$71_3$, the busy-signal transmitter 39 sends busy signals corresponding to these priority values to the busy-signal lines $81_1$~$81_3$.

The clock transmission controller 44 includes a microcomputer and a clock sending/blocking unit for sending/blocking a clock of a prescribed priority value by a command from the microcomputer. When output of a clock having a prescribed priority value has been designated by the setting unit, the microcomputer checks to determine whether a busy signal corresponding to this priority value has been entered, instructs the clock sending/blocking unit to output the clock if a busy signal corresponding to the priority value has not been entered, and instructs the clock sending/blocking unit to block the signal if the busy signal has been entered.

Thus, even if a setting unit $40_i$ (i=1~N) makes a setting in such a manner that a clock of a prescribed priority value is outputted redundantly from a channel board, a busy signal corresponding to this priority value will have been issued beforehand. As a result, the setting can be ignored, thereby making it possible to prevent redundant settings in reliable fashion.

The quality extractor 31c of a channel board instructed to send a clock of a prescribed priority value extracts the quality data (the S1 byte of the overhead) from the main signal received from a line. Next, the channel board enters this quality data, along with the priority value of this clock, into the equipment-clock decision unit 50 via the quality sending/receiving line 72. On the basis of the priority value and quality value received via the line, the equipment-clock decision unit 50 decides the equipment clock from among the clocks entering via the clock supply lines $71_1$~$71_3$. Besides a clock extracted from a line, an external clock is available as a candidate for the equipment clock. In a case where the setting unit 51 has set the priority value and quality value of the external clock, the busy-signal transmitter 50d sends the busy signal to the busy-signal line that corresponds to the priority value of the external clock. As a result, the channel board can no longer send the equipment-clock decision unit 50 a clock having the same priority value as that of the external clock and, hence, redundant settings can be prevented. On the basis of the quality and priority value of the clock that has entered from the channel board and of the clock entered externally, the equipment-clock decision circuit 50a decides the equipment clock and enters the clock into each channel board.

(B) FIRST EMBODIMENT (a) Overall Construction

Figure 4:
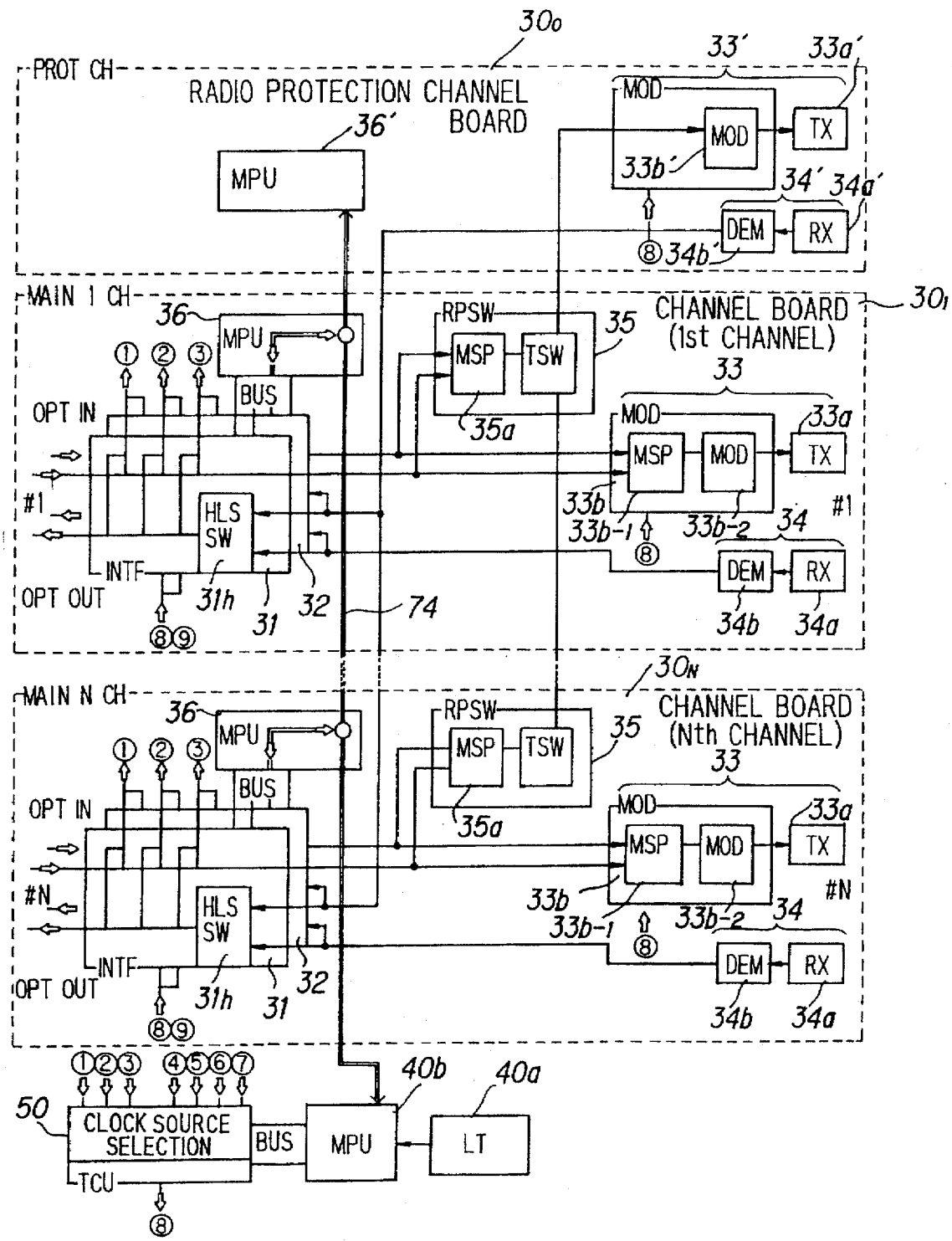
FIG. 4 is a diagram showing the overall construction of a radio apparatus according to a first embodiment of the present invention.

FIG. 4 is a diagram showing the overall construction of a first embodiment of a radio apparatus according to the present invention.

The apparatus includes channel boards $30_1$~$30_N$ provided to correspond to channels #1~#N, and a protection channel board $30_0$ of a radio line. The protection channel board $30_0$ sends and receives signals to and from an opposing apparatus via a radio protection line when a fault develops in one of the radio lines of the N-number of channels. In other words, the radio lines are arranged to have 1:N redundancy.

On a per channel board basis, a monitoring control console 40a attaches priority values (PR1~PR3) to clocks contained in signals sent in via optical and radio lines and sets whether the clocks of the respective priority values are sent from each channel board. A microcomputer (MPU) 40b executes switching control of radio lines at the occurrence of failure and executes transfer control according to which setting information from the monitoring control console 40a is transferred to each channel board. Numeral 50 denotes a timing control unit (TCU) for deciding a clock shared by the entire radio apparatus, and number 74 denotes a serial bus.

The channel boards $30_1$~$30_N$ have the same construction and possess redundant optical interfaces, namely the optical working interface 31 provided to correspond to an optical working line, and the optical protection interface 32 provided to correspond to an optical protection line. Each channel board further includes the radio transmitter 33, the radio receiver 34, a radio protection switch (RPSW) 35 for entering a signal into the radio protection channel board $30_0$ in the event of a failure, and an microcomputer (MPU) 36 for controlling the optical interfaces.

The optical working and protection interfaces 31, 32 each have a hitless switch 31h. The latter selects and outputs a radio signal from a radio working line if a failure develops in a radio line and selects and outputs a radio signal from a radio protection line in the event of line failure. The radio transmitter 33 has a transmitting circuit (TX) 33a and a modulator 33b. The modulator 33b has a selector (MSP) 33b-1, which selects and outputs a signal outputted by the optical working interface 31 or optical protection interface 32, and a modulator circuit (MOD) 33b-2. The radio receiver 34 has a receiving circuit (RX) 34a and a demodulator circuit (DEM) 34b. The radio protection switch (RPSW) 35 has a selector (MSP) 35a, which selects and outputs a signal outputted by the optical working interface 31 or optical protection interface 32, and a switch (TSW) 35b for entering the signal, which has been outputted by the selector in accordance with a command from the MPU 40b, into the radio protection channel $30_0$.

The radio protection channel $30_0$ includes a radio transmitter 33', a radio receiver 34' and an MPU 36'. The radio receiver 33' has a transmitting circuit (TX) 33a' and a modulator (MOD) 33b', and the radio receiver 34' has a receiving circuit (RX) 34a' and a demodulator circuit (DEM) 34b'.

(b) Flow of Main Signals

Optical signals that have entered from the optical working and protection lines are photoelectrically converted in the optical working and protection interfaces 31, 32, changed over to the equipment clock and entered the signals into the radio transmitter 33. The radio transmitter 33 ordinarily selects the signal from the optical working interface 31, modulates the signal and sends the modulated signal to the opposing apparatus. If a failure develops on the side of the optical working line, the radio transmitter 33 selects the signal from the optical protection interface 32, modulates the signal and transmits it to the opposing apparatus. On the other hand, a signal that has been sent in from the opposing radio apparatus is received and demodulated by the radio receiver 34 and enters the optical working and protection interfaces 31, 32. These change the signals over to the equipment clock and then electro-optically convert the signals and send the optical signals to the optical working line and optical protection line.

However, if a failure develops in a radio line, e.g., in the radio receiving line of the first channel, the demodulator 34b senses the failure and so notifies the MPU 40b via an auxiliary line (not shown) for line switching. In response, the MPU 40b controls the modulator 33-2 of the radio transmitter 33 via the auxiliary line for switching, thereby inserting alarm notification data in the signal so that the opposing radio apparatus will be instructed to switch over to the protection radio line. In response to the alarm notification data, the opposing radio apparatus effects the changeover to the protection radio line and transmits a signal, which contains changeover-completion data, via the standby radio line. When the demodulator 34b' of the radio protection channel 300 senses the changeover-completion data, the demodulator 34b' so notifies the MPU 40b. In response to being notified, the MPU 40b enters an enable signal into the protection switch (RPSW) 35. The protection switch (RPSW) 35 thenceforth enters the signal from, say, the optical working interface 31 into the radio protection channel board $30_0$ to transmit the signal via the radio protection line. Further, the MPU 40b instructs the MPU 36 of the first channel, via the serial bus 74, to changeover the hitless switch (HLSSW) 31h. As a result, the hitless switches 31h of the optical working and protection interfaces 31, 32 thenceforth select and output the signal that has entered via the protection line. By virtue of this operation, a changeover is made to the protection radio line when a failure develops in a radio line.

(c) Overview of Equipment Clock Selection

A clock having the best quality is decided from among the clocks contained in the main signals, which enter each channel board, or the external clock, and the clock decided upon is used by the overall apparatus as the equipment clock. Since three main signals enter each of the channel boards $30_1$~$30_N$ via the optical working line, optical protection line and radio line, the monitoring control console 40a attaches the priority values PR1~PR3 to the clocks, on a per channel board basis, in order of descending quality. The monitoring control console 40a then instructs the channel board, which is predicted on a per priority value basis to have the best quality, to send the clock having this priority value to the TCU 50. As a result, the channel board that has been instructed to send the clock transmits this clock to the TCU 50 via a clock supply line. Further, the channel board that has been instructed to send the clock separately transmits the priority value of the clock and the actual quality value of the clock to the TCU 50. On the basis of the quality value and priority value of the received clock, the TCU 50 decides the equipment clock EC, enters the equipment clock EC into each channel board and enters the priority value and quality value of the equipment clock into each channel board.

Figure 5:
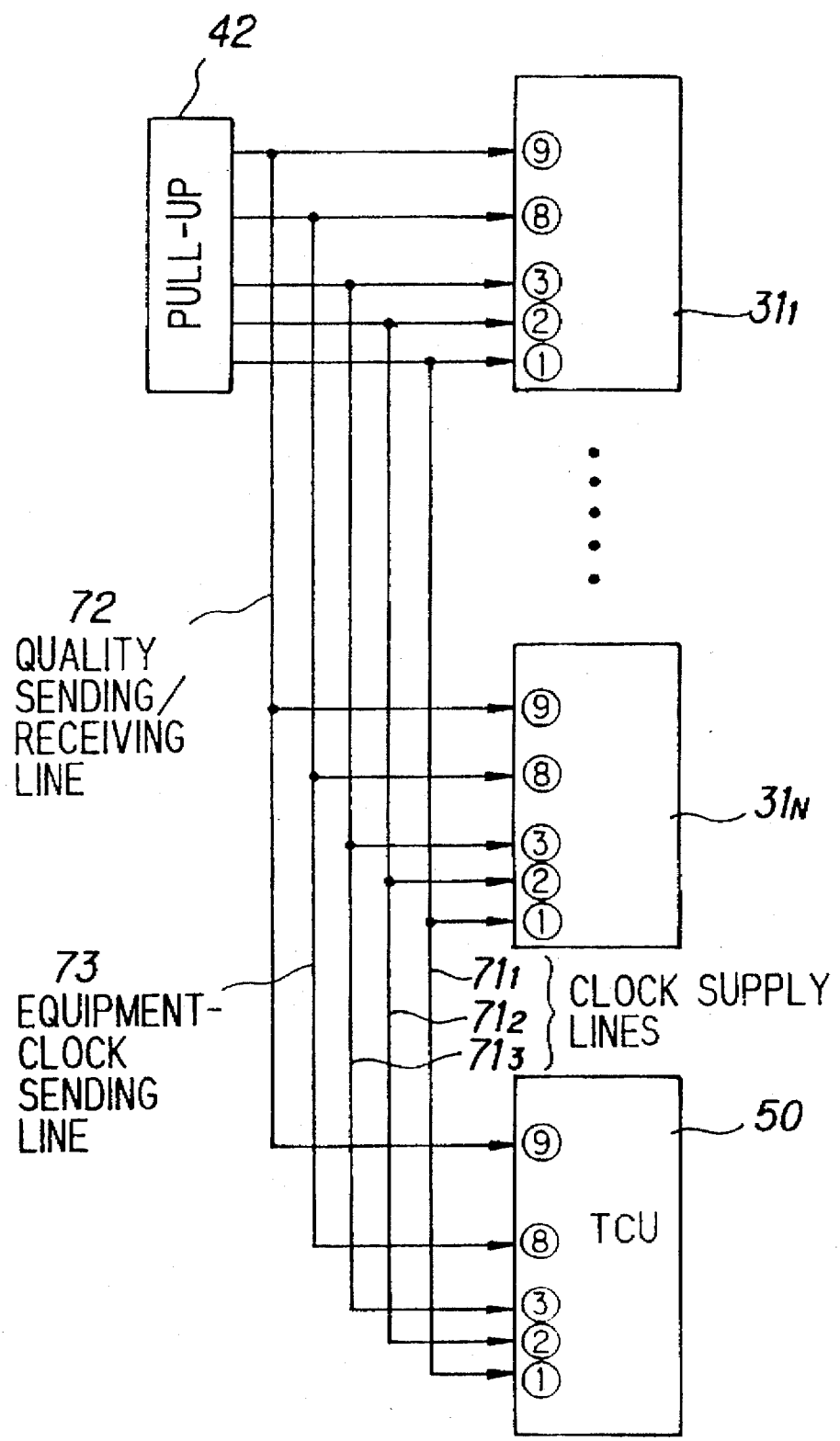
FIG. 5 is a diagram showing the connection relationship between channel boards of N-number of channels and a TCU.

FIG. 5 is a diagram showing the connection relationship between the channel boards of the N-number of channels and the TCU. Numerals $30_1$~$30_N$ denote the channel boards for the N-number of channels, and numeral 50 denotes the single common timing control unit (TCU) 50. Numeral 42 designates a pull-up unit.

Corresponding ones of clock output terminals ①, ②, ③ conforming to the priority values PR1, PR2, PR3 in each of the channel boards $30_1$~$30_N$ are connected together by respective ones of the clock supply lines $71_1$, $71_2$ $72_3$ and all are connected to the shared timing control unit (TCU) 50 in order to reduce the number of connecting lines between frames and between shelves. The clocks outputted by each channel board are hard-ORed. The clock having the first priority value PR1 is outputted to the clock supply line $71_1$ solely from a prescribed one of the N-channels of channel boards $30_1$~$30_N$. Similarly, the clocks having the second and third priority values PR2, PR3 also are outputted to the clock supply lines $71_2$, $71_3$ from a prescribed one of the channel boards. These clocks enter the TCU 50. The SSMB transmission bus line (quality sending/receiving line) 72 connects a quality sending/receiving terminal ⑨ of each of the channel boards $30_1$~$30_N$ and a quality sending/receiving terminal ⑨ of the TCU 50. The SSMB (the S1 byte indicating the quality value) and the priority value are transmitted between the channel boards and the TCU on this bus line. The equipment-clock sending line 73 connects equipment-clock sending/receiving terminals ⑧ and enters the equipment clock EC, which has been decided by the TCU 50, into each of the channel boards $30_1$~$30_N$. The construction of the SSMB transmission bus line 72 and the method of transferring data is as described earlier in accordance with FIGS. 32~35.

Under the control of the MPU 40b, the information set by the setting unit 40a (FIG. 4) is sent to the MPU 36 of each channel board via the serial bus 74. In the prior art, the serial bus 74 is used to transmit line switching information at the time of a failure in a radio line. In the present invention, however, the serial bus 74 is adapted to transfer the setting information of each channel board as well. FIG. 6 is a diagram for describing the format of a frame on the serial bus. The frame is composed of a flag FLAG (eight bits), a transmission destination address ADR (four bits), a frame number FNo. (four bits), data 1~data 4 (DATA1~DATA4: eight bits each), a CRC code (six bits) and a stop code SP (two bits). The DATA4 is a portion which sends the line switching information, and the remaining three items of data DATA1~DATA3 are used to designate the priority value of the clock of each channel as well as output/blockage of the clock.

(d) Construction of Optical Interface (d-1) Construction

Figure 7:
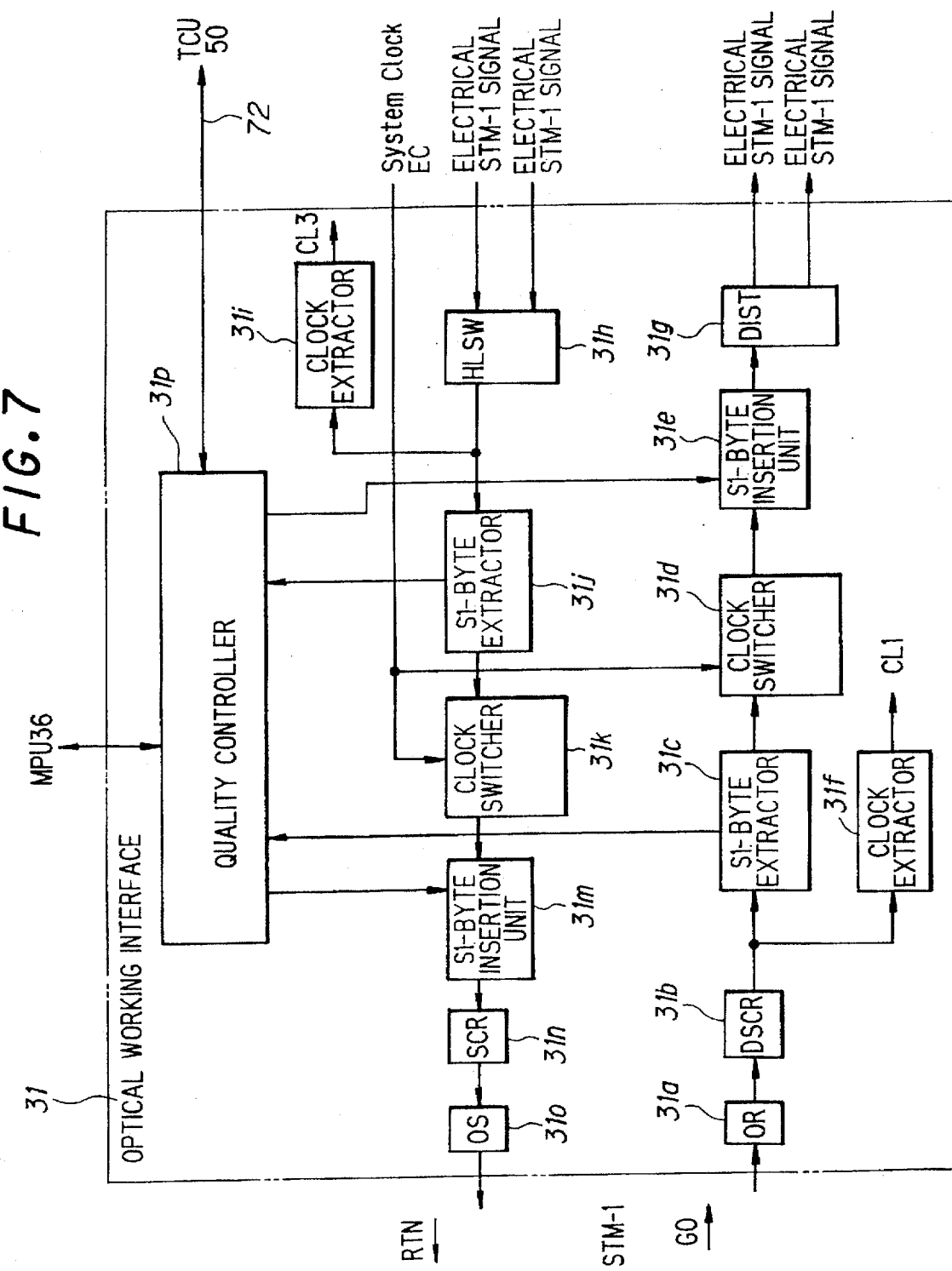
FIG. 7 is a diagram showing the construction of an optical working interface.

FIG. 7 is a diagram showing the construction of the optical working interface. The optical protection interface has exactly the same construction.

An optical receiver 31a receives an optical signal, which has the SDH frame format, that has entered from an optical line in the GO (outgoing) direction, and converts the optical signal to an electric signal. The electrical signal is applied to a descrambler circuit 31b. An S1-byte extractor 31c extracts the overhead (the S1 byte indicating the quality value of a clock) of the optical reception signal. A clock switcher 31d temporarily stores the reception data in a buffer and then reads the data out of the buffer in sync with the equipment clock EC, thereby switching the clock. An S1-byte insertion unit 31e inserts the overhead (the S1 byte indicating the quality value of the equipment clock or Q=F). A clock extractor 31f extracts the clock CL1 from the main signal received from the optical line, and a distributor 31g distributes this signal to the radio protection side and radio working side.

The hitless switch 31h selects and outputs a radio reception signal from the radio working line or from the radio protection line. A clock extractor 31*i* extracts the clock C3 contained in the radio reception signal. An S1-byte extractor 31*j* extracts the overhead (the S1 byte indicating the quality value of a clock) of the radio reception signal. A clock switcher 31*k* temporarily stores the reception data in a buffer and then reads the data out of the buffer in sync with the equipment clock EC, thereby switching the clock. An S1-byte insertion unit 31*m* inserts the overhead (the S1 byte indicating the quality value of the equipment clock or Q=F). The output of the clock switcher 31*k* is applied to a scrambler circuit 31*n*. An optical transmitter 31*o* converts the electric signal to an optical signal and sends the optical signal to the optical line in the RTN direction. A quality controller 31*p* decides the transmission quality and insertion quality.

(d-2) Processing for deciding transmission quality value

When transmission of a clock of a prescribed priority value is commanded from the monitoring control console 40*a* via the MPU 40*b* and MPU 36, it is required that each channel board transfer the priority value and quality value of the clock to the TCU 50 via the quality sending/receiving line 72. Accordingly, the quality controller 31*p* of the optical working interface 31 decides the quality value to be sent. This is done by executing the processing of FIG. 8. Specifically, the quality controller 31*p* determines whether transmission of the clocks CL1, CL3 has been commanded by a command from the MPU 36 (the monitoring control console 40*a*) (step 101). If transmission has not been commanded, it is not necessary to transmit a quality value and, hence, quality decision processing is terminated. However, if transmission of one of the clocks CL1, CL3 has been commanded, the quality value of this clock is decided and sent to the TCU 50 (step 102).

More specifically, if transmission of clock CL1 has been commanded, the S1 byte extracted from the S1-byte extractor 31*c* is decided upon as the transmission quality value and this quality value, together with the priority value that has been set for the clock CL1, is sent to the TCU 50 via the quality sending/receiving line 72. If transmission of the clock CL2 has been commanded, the S1 byte extracted from the S1-byte extractor 31*j* is decided upon as the transmission quality value and this quality value, together with the priority value that has been set for the clock CL3, is sent to the TCU 50 via the quality sending/receiving line 72. The foregoing is the processing executed by the quality controller 31*p* in the optical working interface 31. The quality controller in the optical protection interface 32 executes identical processing.

(d-3) Processing for deciding inserted quality value

When the equipment clock EC enters, the optical interface switches to the equipment clock and sends the main signal. It is necessary to insert the quality value of the clock into the main signal. The quality controller 31*p* decides the quality value inserted and commands the S1-byte insertion units 31*e*, 31*m* to insert the S1 byte of this quality value. The quality value to be inserted is decided in such a manner that a clock loop will not be formed.

When optical interfaces are not redundant

Figure 9:
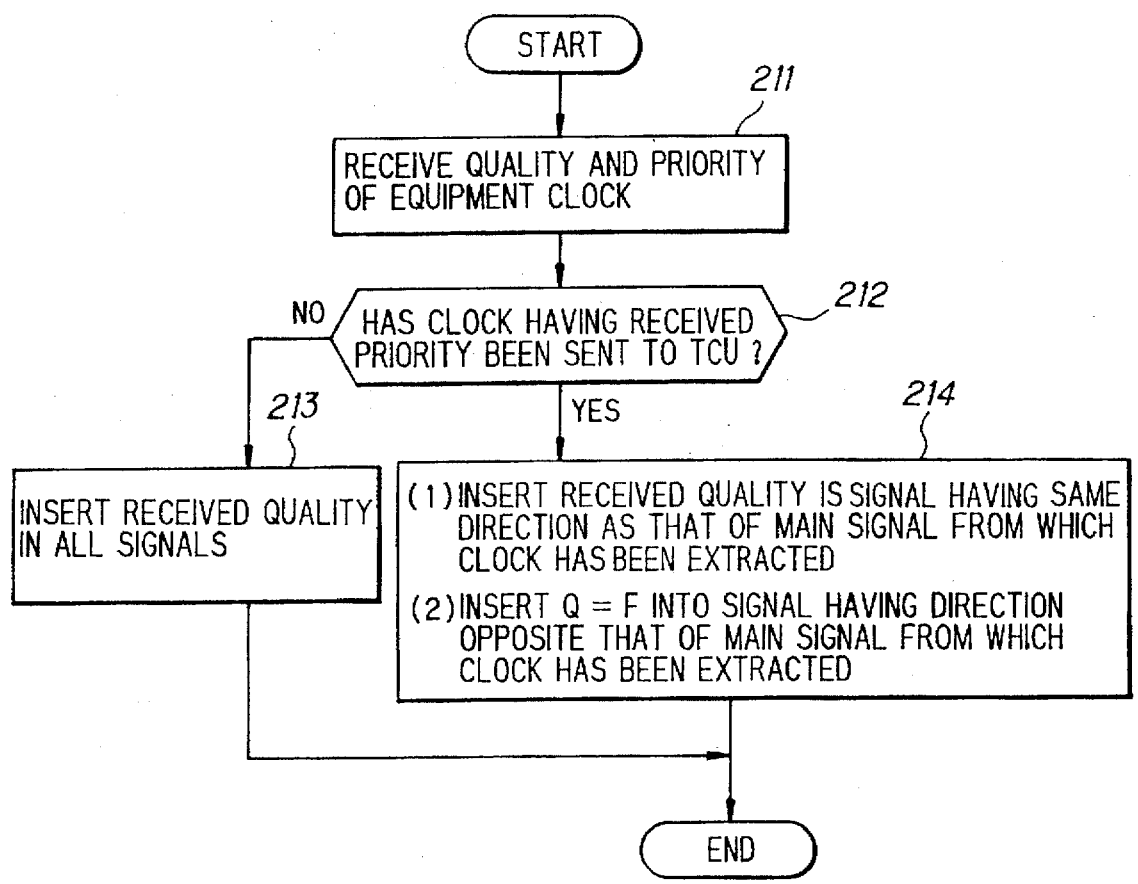
FIG. 9 is a flowchart (when there is no redundancy) of processing for deciding inserted priority.

FIG. 9 is a flowchart of processing for deciding an inserted quality value in a case where optical interfaces are not redundant.

Upon receiving the quality value and priority value of the equipment clock from the TCU 50 (step 211), the priority controller 31*p* determines whether the clock of this priority value has been sent to the TCU 50, i.e., whether transmission of the clock having this priority value has been commanded by the MPU 36 (step 212).

If transmission of the clock having this priority value has not been commanded by the MPU 36 and the clock has not been transmitted, then the equipment clock EC differs from the clocks CL1, CL3 and the equipment clock is the clock of another channel board. Accordingly, the quality value to be inserted into the main signals transmitted in all directions is adopted as the quality value that has been received from the TCU (step 213).

However, if transmission of the clock of the priority value sent from the TCU 50 has been commanded by the MPU 36 and this clock is being sent, (1) the quality value of a signal sent in the direction the same as that of the main signal from which this clock has been extracted is adopted as the quality value received from the TCU, and (2) the quality value of the signal sent in a direction opposite that of the main signal from which the clock has been extracted is made Q=F ("Don't use for sync") so that a clock loop is not formed (step 214).

When optical interfaces are redundant

Figure 10:
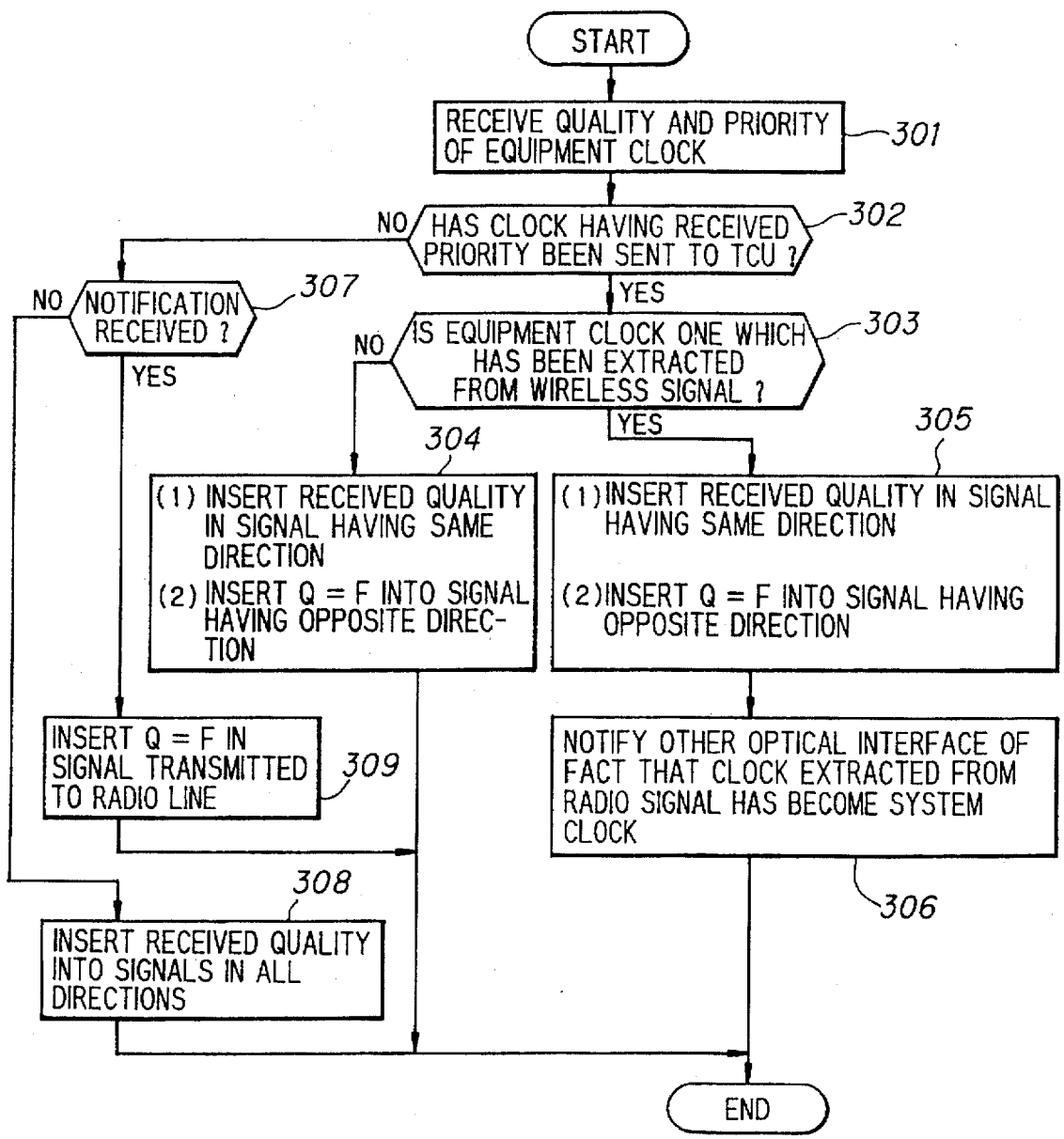
FIG. 10 is a flowchart (when there redundancy) of processing for deciding inserted priority.

FIG. 10 is a flowchart of processing for deciding an inserted quality value in a case where optical interfaces are redundant.

Upon receiving the quality value and priority value of the equipment clock from the TCU 50 (step 301), the priority controller 31*p* determines whether the clock of this priority value has been sent to the TCU 50, i.e., whether transmission of the clock having this priority value has been commanded by the MPU 36 (step 302).

If transmission of the clock of the priority value sent from the TCU 50 has been commanded by the MPU 36 and this clock is being sent, it is determined whether the equipment clock is a clock that has been extracted from a radio reception signal (step 303). If the equipment clock is not a clock that has been extracted from a radio reception signal, (1) the quality value of a main signal sent in the direction the same as that of the main signal from which this clock has been extracted is adopted as the quality value received from the TCU, and (2) the quality value of the signal sent in a direction opposite that of the main signal from which the clock has been extracted is made Q=F ("Don't use for sync") so that a clock loop is not formed (step 304).

If it is found at step 303 that the equipment clock is a clock that has been extracted from a radio reception signal, then processing similar to that of step 304 is executed, i.e., (1) the quality value of a signal sent in the direction the same as that of the main signal from which this clock has been extracted is adopted as the quality value received from the TCU, and (2) the quality value of the signal sent in a direction opposite that of the main signal from which the clock has been extracted is made Q=F ("Don't use for sync") so that a clock loop is not formed (step 305).

A working line and a protection line are regarded as separate channels. Therefore, if the equipment clock is the same as the clock of the optical protection interface, the quality value of the equipment clock is added on as the quality value regardless of the direction of transmission of the main signal in the optical working interface. Further, if the equipment clock is the same as the clock of the optical working interface, the quality value of the equipment clock is added on as the quality value regardless of the direction of transmission of the main signal in the optical protection interface. In such case there is the possibility that a clock loop will be formed.

For example, when the clock (Q=3) of the radio reception signal that has entered the optical protection interface 32 in the channel board of FIG. 2 becomes the equipment clock, the quality of the main signal sent from the optical protection interface 32 to the side of the radio line becomes Q=F but the quality of the main signal sent from the optical working interface 31 to the side of the radio line becomes Q=3. When the main signal outputted by the optical working interface 31 is sent to the opposing radio apparatus via the radio transmitter 33, there is the possibility that a loop of identical clocks will be formed.

Accordingly, in a case where the clock extracted from the radio reception signal is the equipment clock, the quality controller 31p so notifies the other optical interface (the optical protection interface 32) (step 306).

If it is found at step 302 that transmission of the clock having the priority value of which notification has been given by the TCU 50 has not been commanded by the MPU 36 and the clock has not been transmitted, then it is determined whether notification to the effect that "the clock extracted from the radio reception signal is the equipment clock" has been received from the other interface, namely the optical protection interface 32 (step 307).

If such notification has not been received, then the quality value to be inserted into the main signals transmitted in all directions is adopted as the quality value that has been received from the TCU (step 308). If it is found at step 307 that the aforementioned notification has been received, then the quality value to be inserted into the main signal sent to the radio line is made Q=F ("Don't use for sync") and the quality values of the other main signals are adopted as the quality values received from the TCU (step 309). By adopting this expedient, a signal path of identical clocks will no longer form a loop.

(e) Overall Construction of Optical Interfaces

Figure 11:
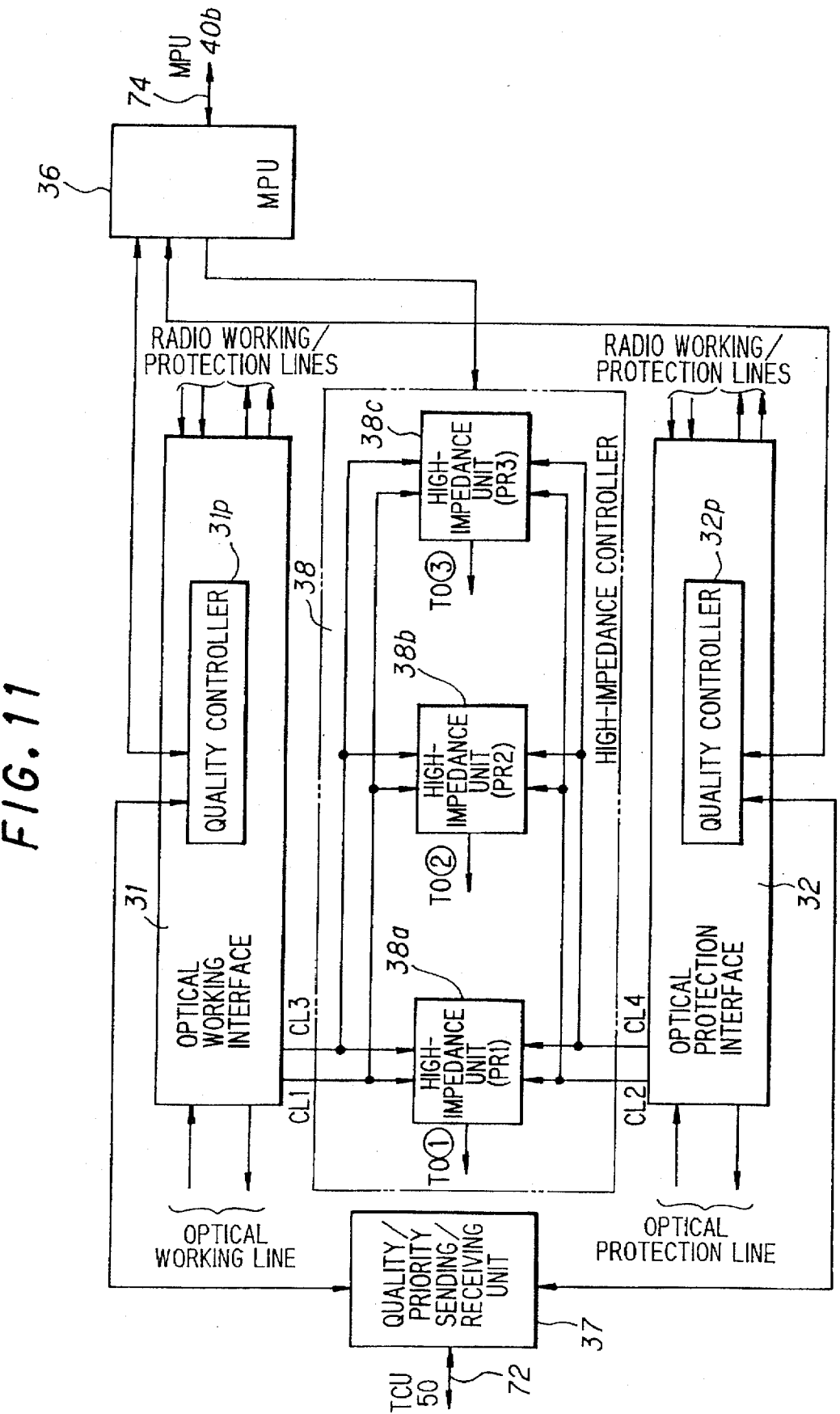
FIG. 11 is a diagram showing the overall construction of an optical interface.

FIG. 11 is a diagram illustrating the overall construction of an optical interface. Shown in FIG. 11 are the optical working interface 31, the quality controller 31p, the optical protection interface 32 and the quality controller 32p. The clock CL2 outputted by the optical protection interface 32 is the clock extracted from the main signal received from the optical protection line, the clock CL4 outputted by the optical protection interface 32 is the clock extracted from the radio reception signal, and the clocks CL4, CL3 are identical. Numeral 36 denotes the MPU, 37 a quality/priority sending/receiving unit for sending and receiving a quality value and a priority value to and from the TCU 50. Numeral 38 denotes a high-impedance controller for executing high-impedance control in accordance with a command from the MPU 36, which has received setting information from the monitoring control console 40a (FIG. 4), thereby controlling transmission/blockage of clocks having a prescribed priority.

The quality controllers 31p, 32p are capable of sending data to and receiving data from the MPU 36 and are so adapted to be capable of ascertaining the priority information of each clock and the priority value of a clock whose transmission has been designated. Further, the quality controllers 31p, 32p are capable of communicating with each other directly or via the MPU 36.

Figure 8:
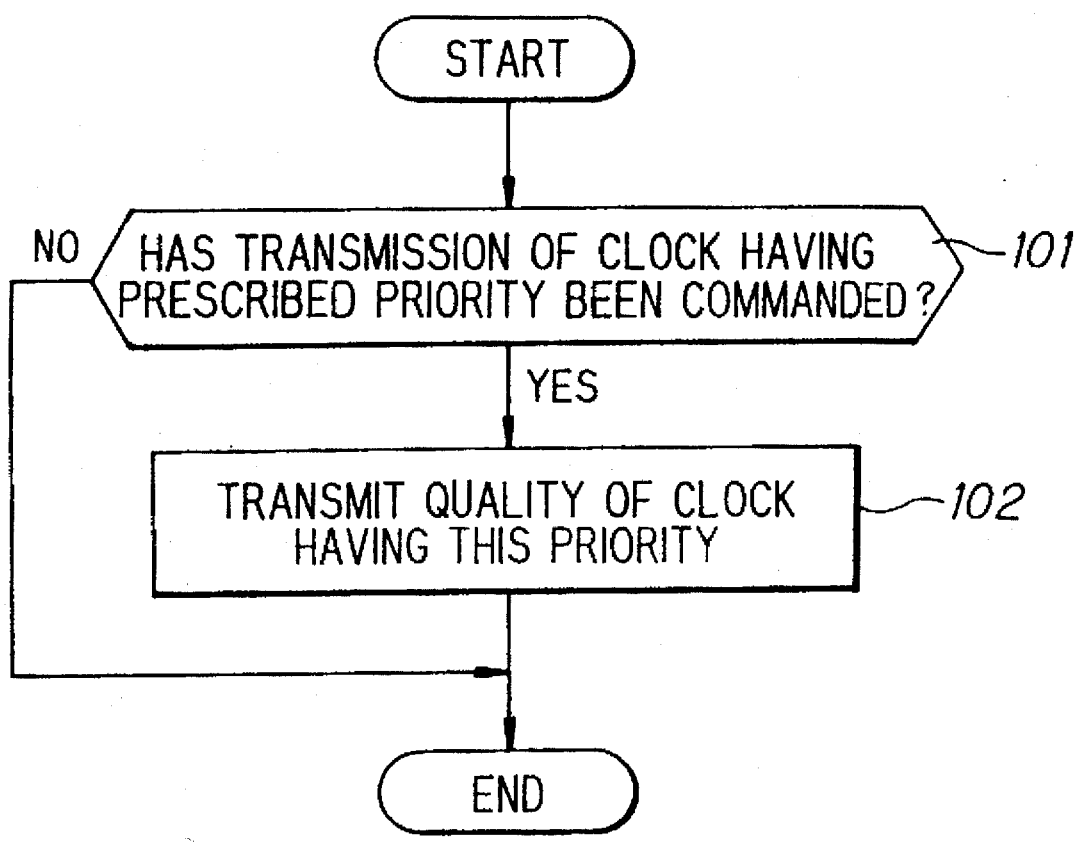
FIG. 8 is a flowchart of processing for deciding transmission quality.

The quality/priority sending/receiving unit 37 receives the quality value and priority value of the clock decided by the quality controllers 31p, 32p in accordance with the control shown in FIG. 8, sends these values to the TCU 50, receives the quality value and priority value of the equipment clock EC from the TCU 50 and enters these values into the quality controllers 31p and 32p, respectively.

The high-impedance controller 38 has a high-impedance unit 38a for transmitting/blocking the clock having the first priority value PR1, a second high-impedance unit 38b for transmitting/blocking the clock having the second priority value PR2, and a third high-impedance unit 38c for transmitting/blocking the clock having the third priority value PR3. If the priority value PR1 is attached to the clock CL1, the priority value PR2 to the clock CL2 and the priority value PR3 to the clock CL3, high-impedance control is carried out as follows:

The high-impedance unit 38a blocks the clocks CL2~CL4 by high-impedance control. The high-impedance unit 38a controls the transmission/blockage of the clock CL1 in accordance with a command (to transmit or block the clock having the priority value PR1) from the MPU 36. For example, if blockage of the clock having the priority value PR1 is commanded, the high-impedance unit 38a blocks all of the clocks CL1~CL4. If transmission of the clock having the priority value PR1 is commanded, then the high-impedance unit 38a sends the clock CL1 to the clock supply line $71_1$ via the terminal ① (see FIGS. 4 and 5).

The high-impedance unit 38b blocks the clocks CL1, CL3~CL4 by high-impedance control. Further, the high-impedance unit 38b controls transmission/blockage of clock CL2 in accordance with a command from the MPU 36 (a command to transmit or block the clock having the priority value PR2). For example, if blockage of the clock having priority value PR2 is commanded, then high-impedance unit 38b blocks all of the clocks CL1~CL4. If transmission of the clock having priority value PR2 is commanded, the high-impedance unit 38b sends the clock CL2 to the clock supply line $71_2$ via the terminal ② (see FIGS. 4 and 5).

The high-impedance unit 38c blocks one of the clocks CL1~CL2, CL3, CL4 (assume in this case that CL4 is blocked) by high-impedance control. Further, the high-impedance unit 38c controls transmission/blockage of clock CL3 in accordance with a command from the MPU 36 (a command to transmit or block the clock having the priority value PR3). For example, if blockage of the clock having priority value PR3 is commanded, then high-impedance unit 38c blocks all of the clocks CL1~CL4. If transmission of the clock having priority value PR3 is commanded, the high-impedance unit 38c sends the clock CL3 to the clock supply line $71_3$ via the terminal ③ (see FIGS. 4 and 5).

(f) Determination of Equipment Clock (f-1) Construction of timing control unit (TCU)

Figure 12:
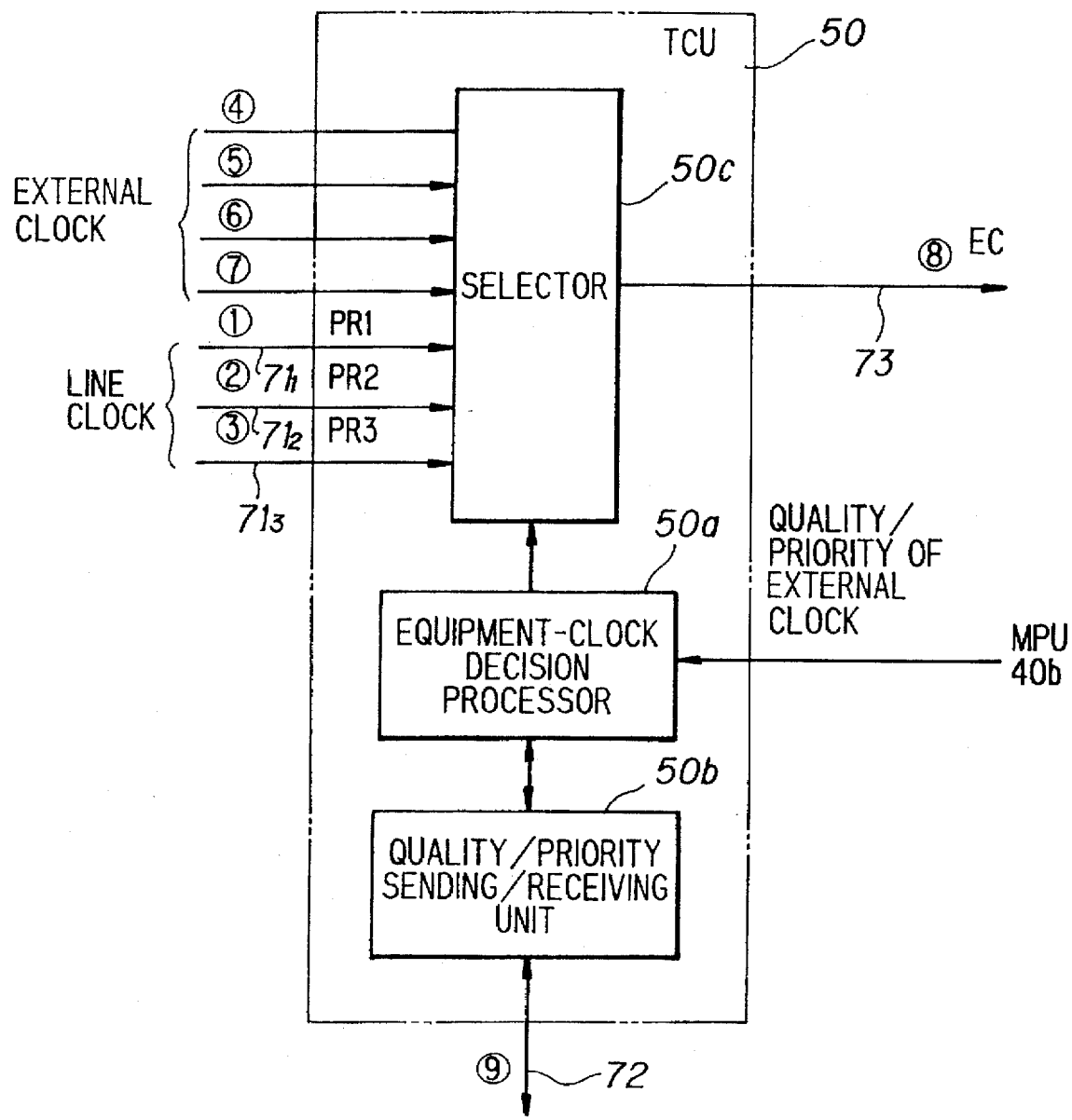
FIG. 12 is a diagram showing the construction of a timing control unit (TCU)

FIG. 12 is a diagram showing the construction of the timing control unit (TCU). The TCU 50 includes an equipment-clock determination processor 50a which, on the basis of the quality value and priority value of each clock, decides upon the clock having the best quality as equipment clock EC. The quality value and priority value of a clock (line clock) that has entered from a channel board enter the equipment-clock determination processor 50a via the quality sending/receiving line 72, and the priority value and quality value of the external clock enter the equipment-clock determination processor 50a from the monitoring control console 40a via the MPU 40b. In a case where the priority values of the external clock and line clock are identical, the equipment-clock determination processor 50a gives precedence to the external clock and adopts this clock as the clock having this priority value.

The TCU 50 further includes a quality/priority sending/receiving unit 50b which receives the quality value and priority value of a clock, which enters from each of the channel boards $30_1$~$30_N$, via the quality sending/receiving line 72, enters these values into the equipment-clock determination processor 50a, receives the quality value and priority value of the equipment clock, which has entered from the equipment-clock determination processor 50a, to each of the channel boards via the quality sending/receiving line 72. The TCU 50 further includes a selector 50c which, from among the external clock and the clocks entering from the clock supply line, selects the clock designated by the equipment-clock determination processor 50a and outputs this clock as the equipment clock EC.

(f-2) Processing for determining equipment clock

Figure 13:
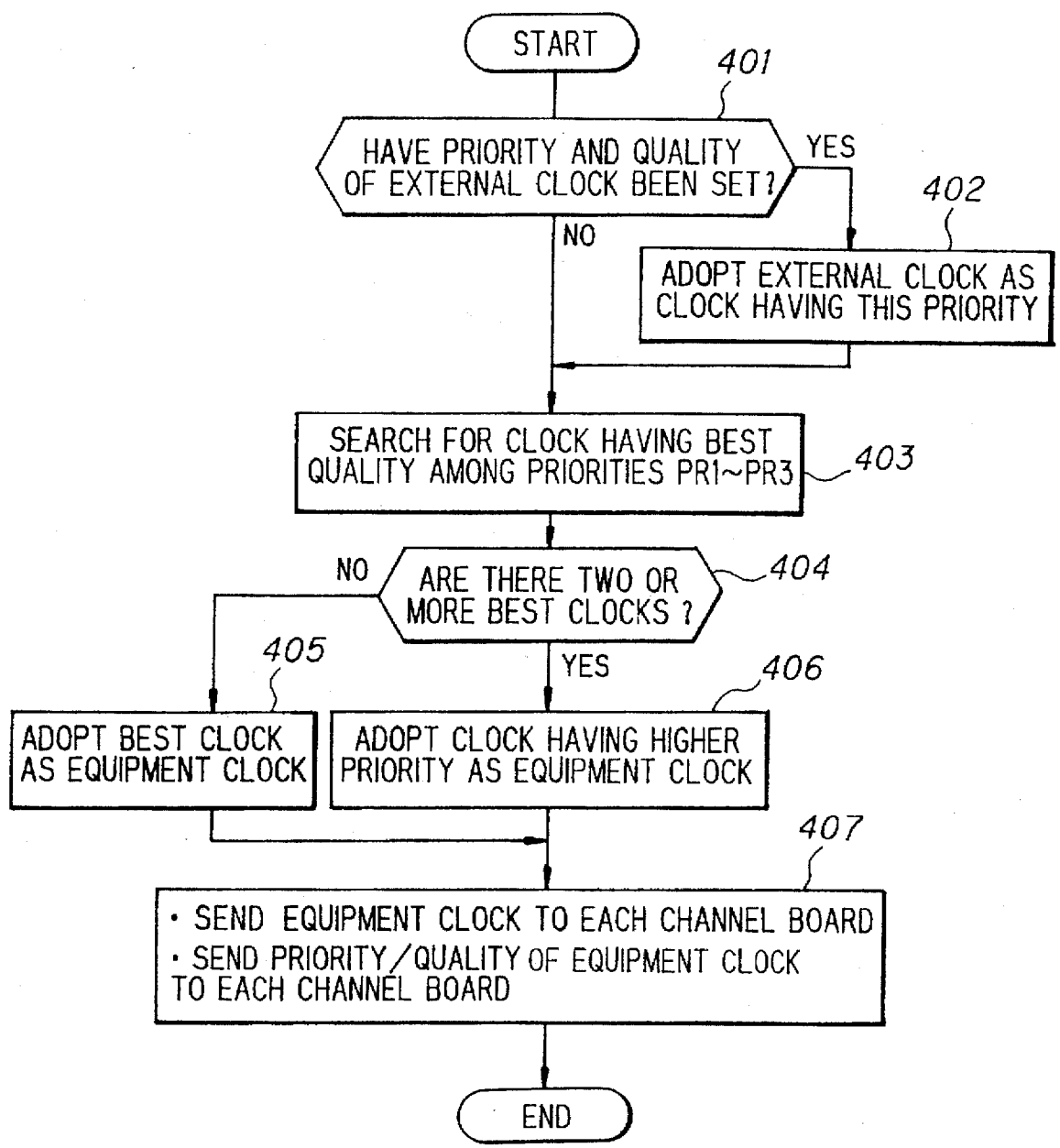
FIG. 13 is a flowchart of processing for determining an equipment clock.

FIG. 13 is a flowchart of processing for determining an equipment clock.

The equipment-clock determination processor 50a checks to determine whether an external clock is present and whether the priority value and quality value of the external clock have been set by the monitoring control console 40a (step 401). If the external clock is present and the priority value thereof has been set, then the equipment-clock determination processor 50a gives precedence to the external clock, adopts it as a clock having this priority (step 402) and decides the equipment clock based upon the quality values and priority values of three clocks inclusive of the equipment clock. On the other hand, if the external clock is not present or if the priority value of the external clock is not entering, then the equipment-clock determination processor 50a decides the equipment clock based upon the quality values and priority values of three clocks entering from the channel board.

More specifically, from among the quality values of the three clocks, the equipment-clock determination processor 50a obtains the clock having the highest quality value (step 403). The equipment-clock determination processor 50a determines whether there are two or more clocks having the highest quality value (step 404). If there is only one such clock, the unit 50a adopts this clock as the equipment clock (step 405). If there are two or more clocks having the highest quality value, the unit 50a adopts the clock having the highest priority value as the equipment clock (step 406). It should be noted that the priority value PR1 is the highest value and that these values are related as follows: PR1>PR2>PR3.

If the equipment clock is determined by the foregoing operation, the equipment-clock determination processor 50a issues a selection command to the selector 50c, in response to which the selector 50c outputs the commanded clock as the equipment clock and enters the clock into each of the channel boards $30_1 \sim 30_N$ via the equipment-clock sending line 73. Further, the equipment-clock determination processor 50a enters the quality value and priority value of the equipment clock into the quality/priority sending/receiving unit 50b, and the latter enters the entered quality value and priority value into each of the channel boards $30_1 \sim 30_N$ via the quality sending/receiving line 72 (step 407).

(g) Overall Control

With regard to each channel board, the monitoring control console 40a (1) attaches priority values to the clocks contained in the signals which arrive via the optical line and radio line and (2) sets whether the clock having each priority value is to be sent to the TCU 50 via the corresponding one of the clock supply lines $71_1 \sim 71_3$. The MPU 40b sends the setting information that has been set for each channel board to each channel board via the serial line 74.

In a case where transmission of clocks having prescribed priority values has been commanded, each of the channel boards $30_1 \sim 30_N$ sends the clocks conforming to these priority values to the clock supply lines $71_1 \sim 71_3$; otherwise, clocks are not sent to the clock supply lines $71_1 \sim 71_3$. The quality controllers 31p, 32p of a channel board commanded to send a clock having a prescribed priority value to the TCU 50 decide the quality value of the clock and enter the this quality value, along with the priority value of the clock, into the TCU 50 via the quality sending/receiving line 72.

On the basis of the priority value and quality of the line clock received via the quality sending/receiving line 72 and the priority value and quality value of the external clock, the TCU 50 obtains the clock having the best quality and adopts this clock as the equipment clock EC. Further, the TCU 50 enters the equipment clock into each channel board via the equipment-clock sending line 73 and enters the quality value and priority value of the equipment clock into each channel board via the quality sending/receiving line 72.

The quality controllers 31p, 32p of each channel board execute the processing of FIG. 10 to obtain the quality value. Further, the clock switchers 31d, 31k (FIG. 7) of the optical working and optical protection interfaces 31, 32 of each channel board synchronize the main signal to the equipment clock EC. Thereafter, the S1-byte insertion units 31e, 31m insert the S1 byte, which has the priority value decided as set forth above, into the main signal and send the signal to the prescribed line.

Thus, a setting unit (comprising the monitoring control console 40a and MPU 40b) which designates the priority value of a clock and whether the clock is to be transmitted or blocked is provided so as to be shared by all of the channel boards, and the setting unit sets, in centralized fashion, the priority values of the clocks in the channel boards and whether a clock is to be outputted or blocked. As a result, settings can be made without error. In particular, it is possible to prevent a situation in which the synchronous network is desynchronized owing to output of two or more clocks on one clock supply line as the result of double entry of the same clock.

(C) SECOND EMBODIMENT (a) Overall Construction

Figure 14:
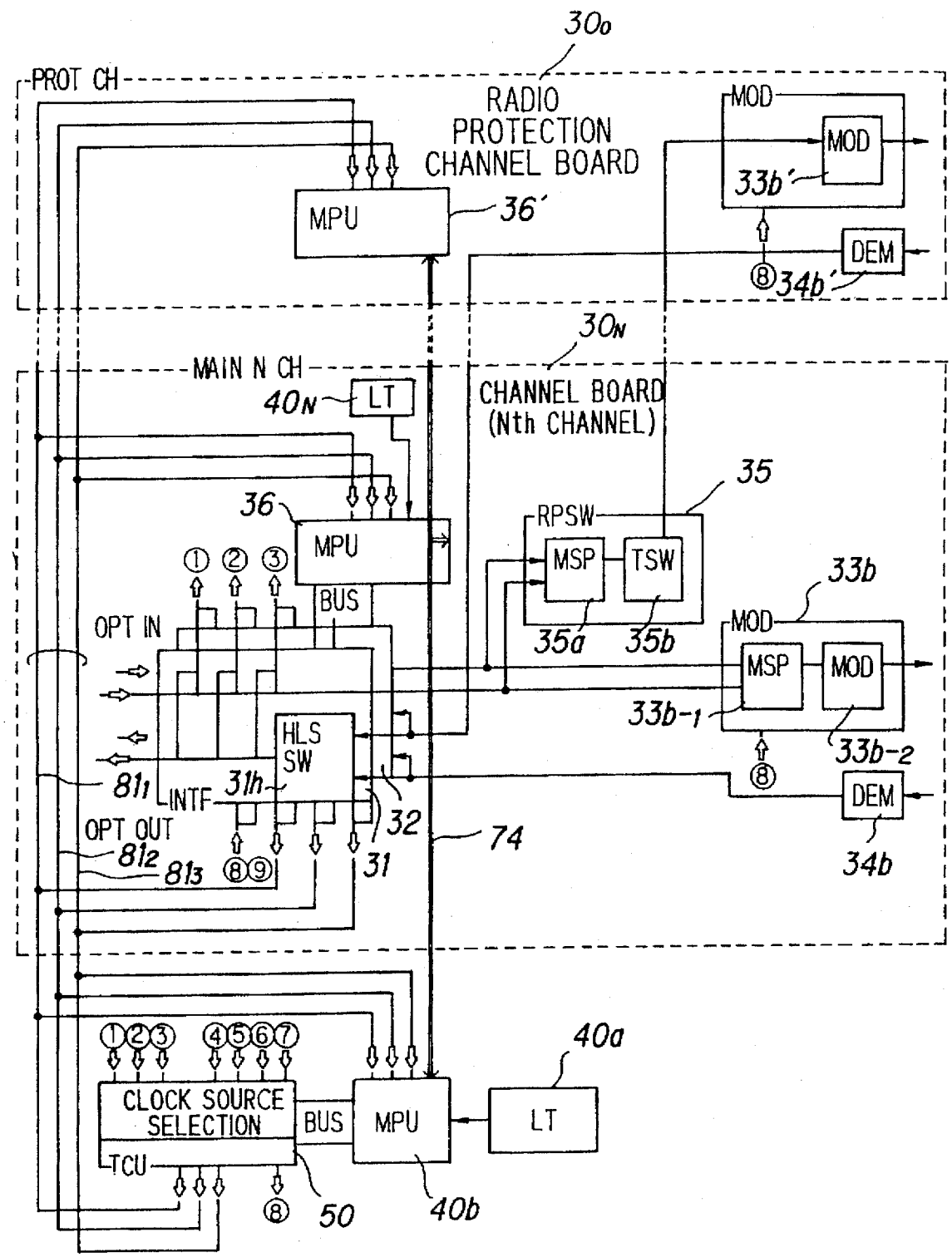
FIG. 14 is a diagram showing the overall construction of a radio apparatus according to a second embodiment of the present invention.

FIG. 14 is a diagram showing the overall construction of a second embodiment of a radio apparatus according to the present invention. Elements identical with those of the first embodiment shown in FIG. 4 are designated by like reference characters.

The second embodiment differs from the first embodiment of FIG. 4 in the following points:

(1) The channel board $30_N$ of only one channel among the N-number of channels is illustrated (the other channel boards are not shown).

(2) Setting of the priority values of clocks in each of the channel boards $30_1 \sim 30_N$ and of output/blockage of the clocks is performed separately from monitoring control consoles $40_1 \sim 40_N$.

(3) Busy-signal lines $81_1 \sim 81_3$ are provided for respective ones of the priority values and a busy signal indicating that output of a clock having a prescribed priority value is sent via a respective ones of these busy-signal lines.

The busy-signal line $81_1$ is a line for sending a busy signal BSY1 conforming to the priority value PR1, the busy-signal line $81_2$ is a line for sending a busy signal BSY2 conforming to the priority value PR2, and the busy-signal line $81_3$ is a line for sending a busy signal BSY3 conforming to the priority value PR3. The busy-signal lines $81_1 \sim 81_3$ interconnect the corresponding terminals of the MPU 36 in each channel board $30_1 \sim 30_N$, of the shared MPU 40b and of the shared TCU 50.

If the monitoring control console $40_N$ instructs the channel board $30_N$ to send the clock having priority value PR1 and the channel board $30_N$ sends the clock having the priority value PR1 to the clock supply line $71_1$, the channel board $30_N$ outputs the busy signal BSY1, which is at the low level, to the busy-signal line $81_1$ corresponding to the priority value PR1. This low-level busy signal BSY1 enters the MPUs 36 of all of the other channel boards as well as the shared MPU 40b. Further, when the shared monitoring control console 40a sets the priority value of the external clock, the TCU 50 sends the low-level busy signal to the busy-signal line corresponding to this priority value.

In a case where the low-level busy signal is being outputted to the busy-signal line $81_1$ for priority value PR1, the MPU 36 of each channel board exercises control in such a manner that transmission of the clock having the priority value PR1 is inhibited. Further, it is so arranged that in a case where the low-level busy signal is being outputted to the busy-signal line $81_1$ for priority value PR1, the shared MPU 40b cannot attach the priority value PR1 to the external clock. In other words, first come, first served. Only the channel board for which transmission of the clock having priority value PR1 is set earliest can transmit the clock of priority value PR1. Alternatively, if the priority value PR1 is set for the external clock earliest, the priority value PR1 can be set for the external clock. The foregoing holds for the other priority values PR2, PR3 as well.

(b) Construction of Optical Interfaces

Figure 15:
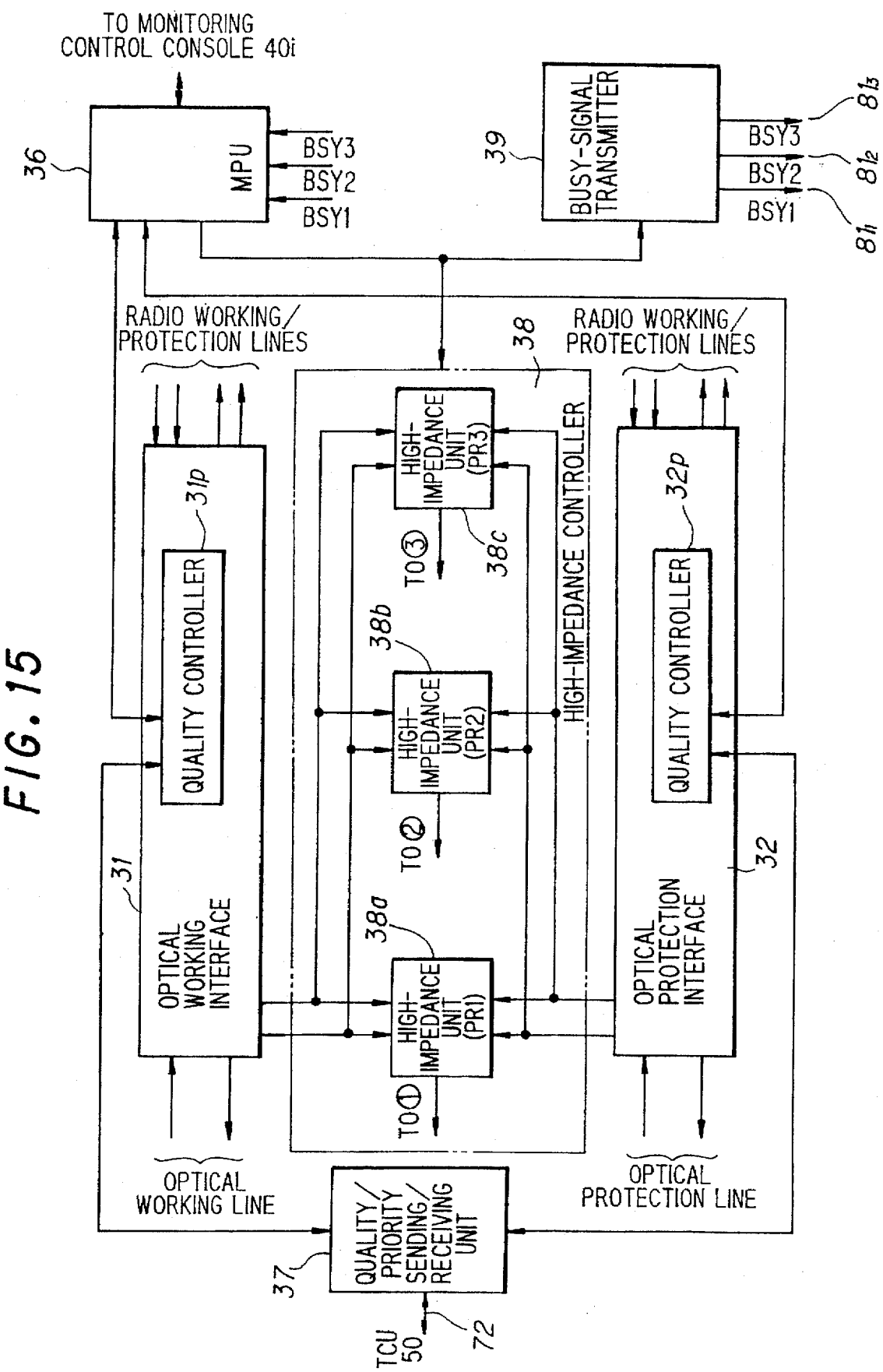
FIG. 15 is a diagram showing the overall construction of an optical interface.

FIG. 15 is a diagram illustrating the overall construction of the optical interface of each channel board. Elements identical with those of the interface according to the first embodiment of FIG. 11 are designated by like reference characters. This arrangement differs from that of FIG. 11 in that (1) a busy signal transmitting unit 39 is provided and it is so arranged that the busy signals BSY1~BSY3 are sent to the busy-signal lines $81_1$~$81_3$; and (2) the busy signals BSY1~BSY3 enter the MPU 36 from the busy-signal lines $81_1$~$81_3$.

(c) Processing Executed by MPU of Each Channel Board

Figure 16:
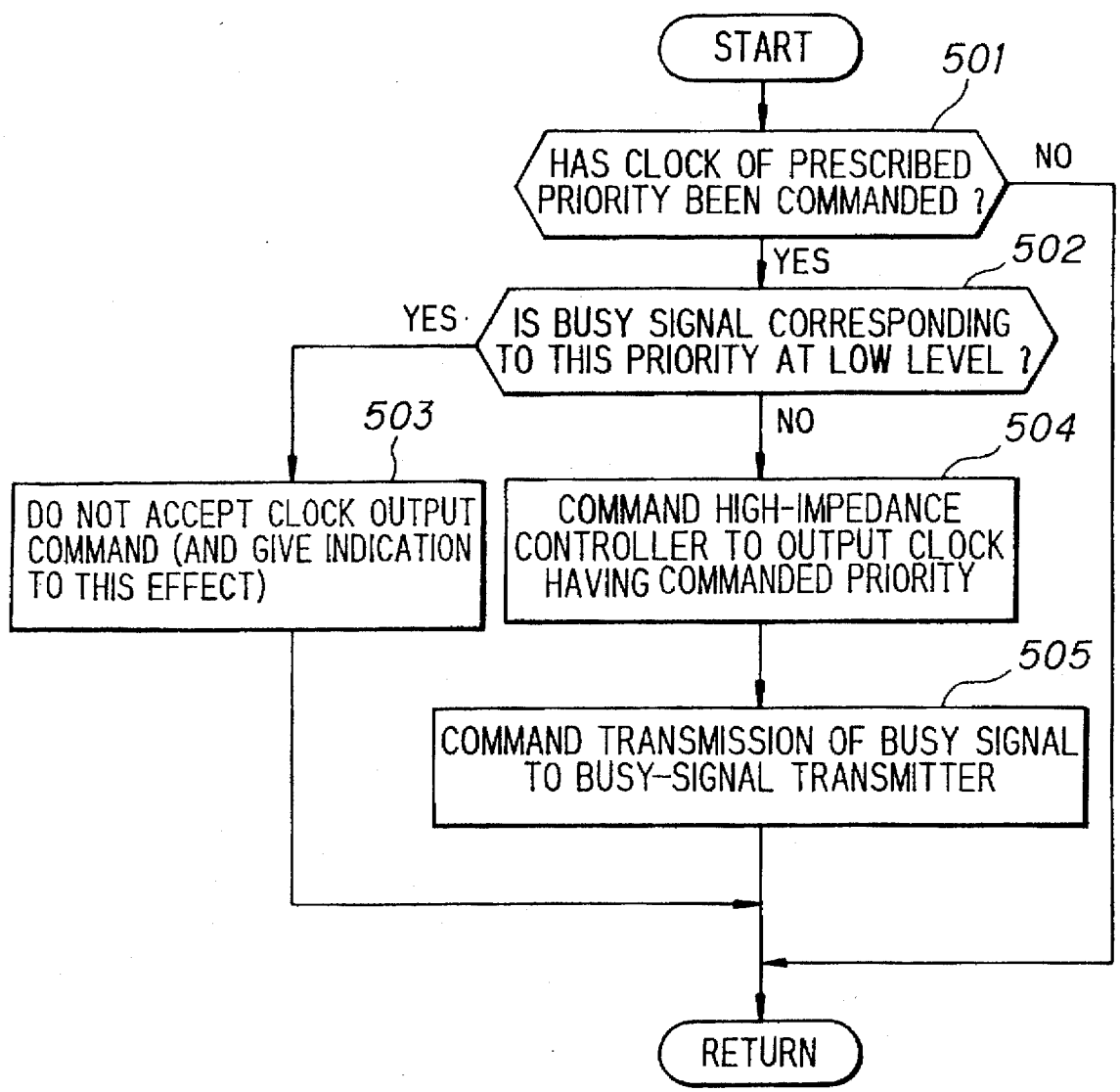
FIG. 16 is a flowchart of processing executed by a microcomputer.

FIG. 16 is a flowchart of processing executed by the MPU in each channel board to control clock output and busy-signal output.

When transmission of a clock having a prescribed priority value is commanded by the monitoring control console $40_N$ ("YES" at step 501), the MPU 36 determines whether a busy signal corresponding to this priority value is entering (i.e., whether the busy signal is at the low level) (step 502). If the busy signal is at the low level, this means that transmission of a clock having this priority value has already been set elsewhere. Accordingly, the MPU 36 does not accept the command calling for output of the clock having the above-mentioned priority value (step 503). In this case, the monitoring control console can be made to indicate the fact that the command has not been accepted. By thus arranging it so that a command to output a subsequently set clock is not accepted, a synchronous network can be prevented from becoming desynchronized even if the same clock is set redundantly.

If it is found at step 502 that the corresponding busy signal is at the high level, the MPU 36 instructs the high-impedance controller 38 (FIG. 15) to output the clock having the designated priority value (step 504). As a result, the high-impedance controller 38 outputs the clock having the designated priority value to the clock supply line. Further, the quality controllers 31p, 32p send the quality value and priority value of this clock to the TCU 50.

Next, the MPU 36 instructs the busy-signal transmitter 39 to send the busy signal corresponding to the above-mentioned priority value (step 505). Upon being so instructed, the busy-signal transmitter 39 sends the low-level busy signal to the busy-signal line for this priority value. As a result, other channel boards become incapable of sending a clock having this priority value. Further, the MPU 40b becomes incapable of setting this priority value for the external clock.

(d) Construction of Busy-Signal Transmitter

Figure 17:
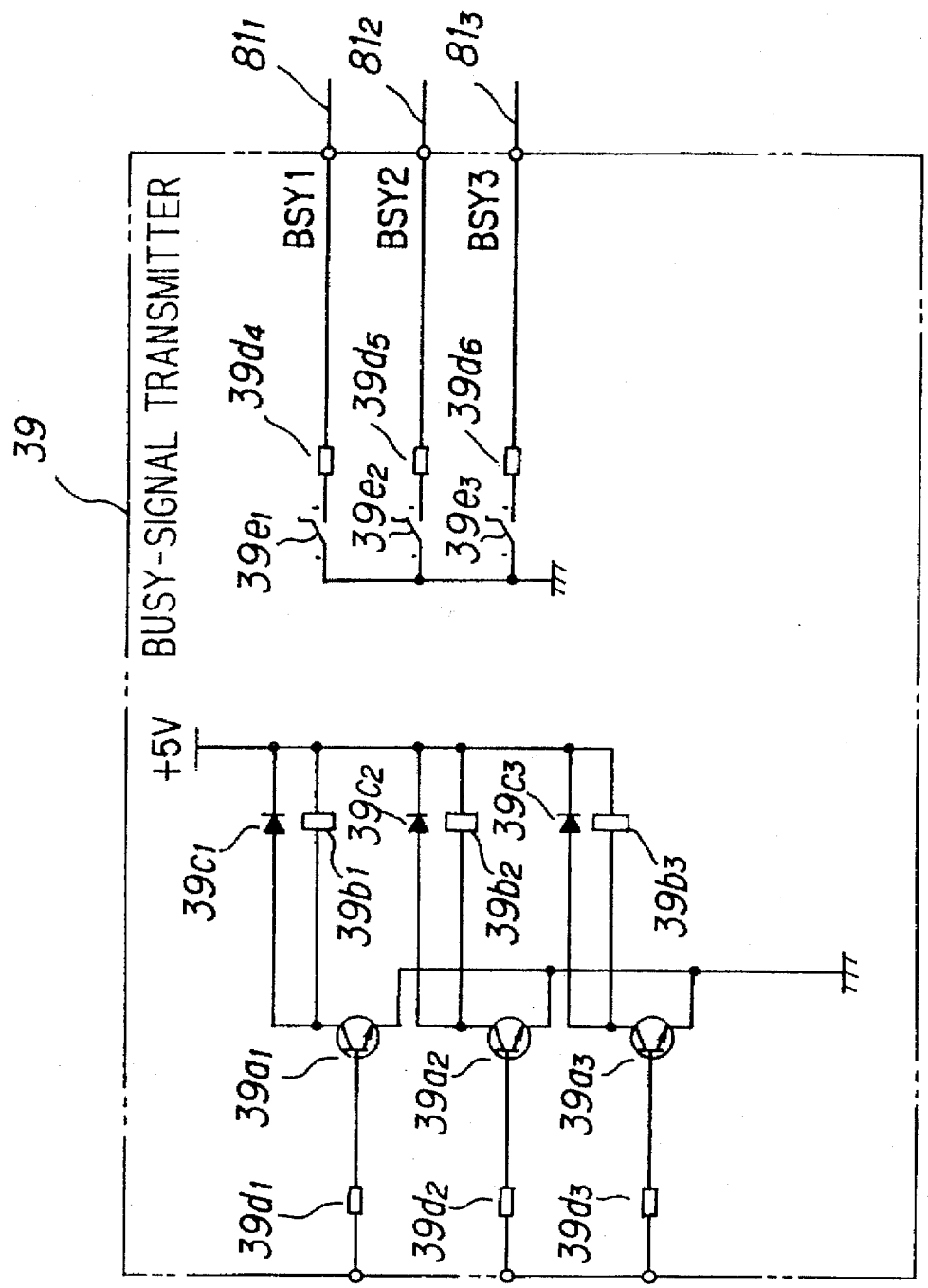
FIG. 17 is a diagram showing the construction of a busy-signal transmitter.

FIG. 17 is a diagram showing the construction of the busy-signal transmitter 39. The busy-signal transmitter 39 includes NPN transistors $39a_1$~$39a_3$, relays $39b_1$~$39b_3$, diodes $39c_1$~$39c_3$ for absorbing back emf, resistors $39d_1$~$39d_6$ and relay contacts $39e_1$~$39e_3$.

The transistor $39a_1$ is turned on to send the busy signal BSY1 (low level) having priority value PR1. When this transistor is turned on, a current flows through the relay $39b_1$ and the relay contact $39e_1$ closes, thereby sending the low-level busy signal BSY1 to the busy-signal line $81_1$.

(e) Construction of Timing Control Unit (TCU)

Figure 18:
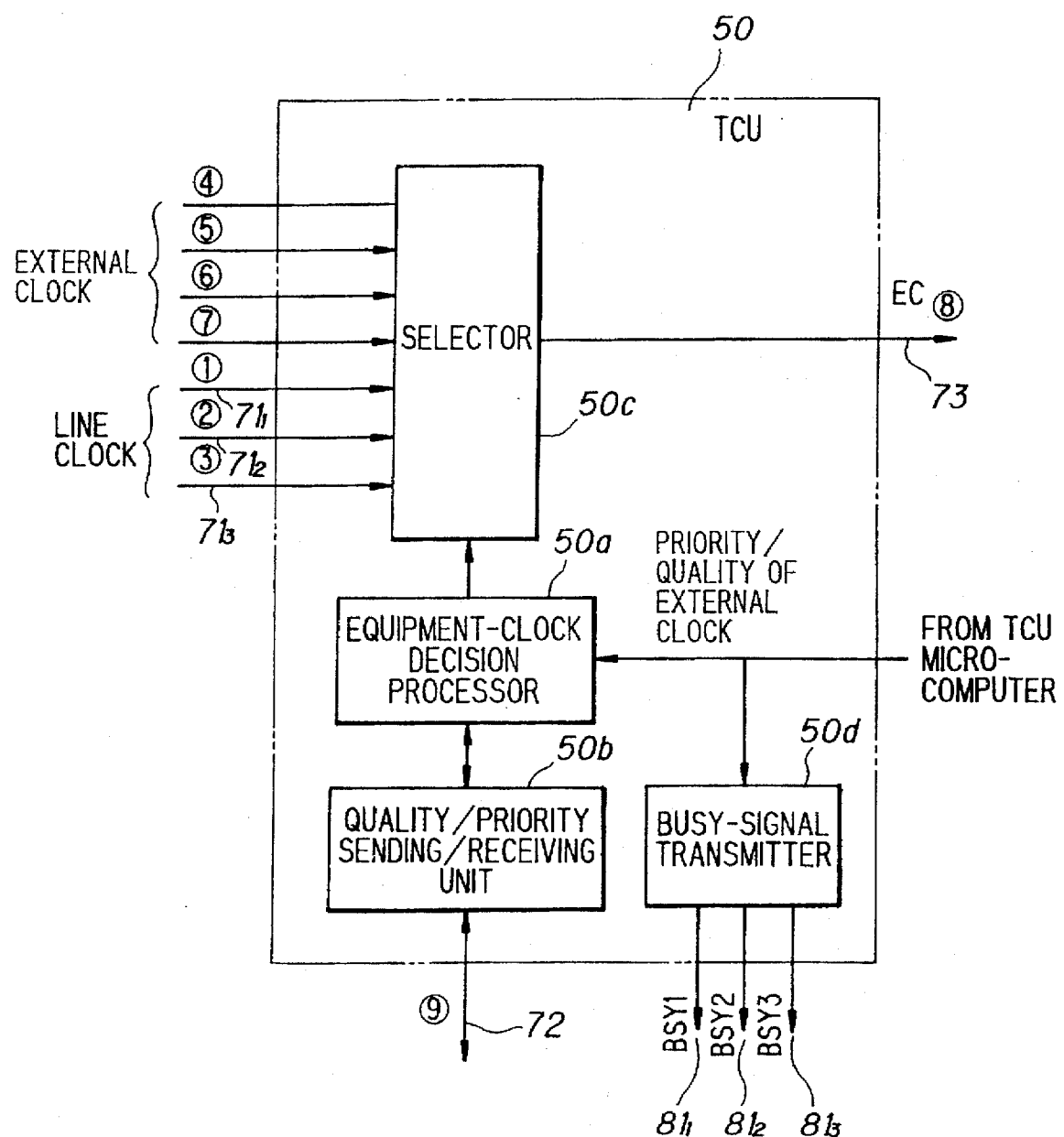
FIG. 18 is a diagram showing the construction of a timing control unit (TCU)

FIG. 18 is a diagram showing the construction of the timing control unit (TCU). Elements identical with those shown in FIG. 12 are designated by like reference characters. This arrangement of the TCU differs from that of FIG. 12 in that the busy-signal transmitter 50d is provided. When a prescribed priority value is attached to the external clock by a setting made by the monitoring control console 40a, the busy-signal transmitter 50 sends a low-level busy signal to the busy-signal line corresponding to this priority value so that other channel boards will not output a clock corresponding to this priority value.

Figure 19:
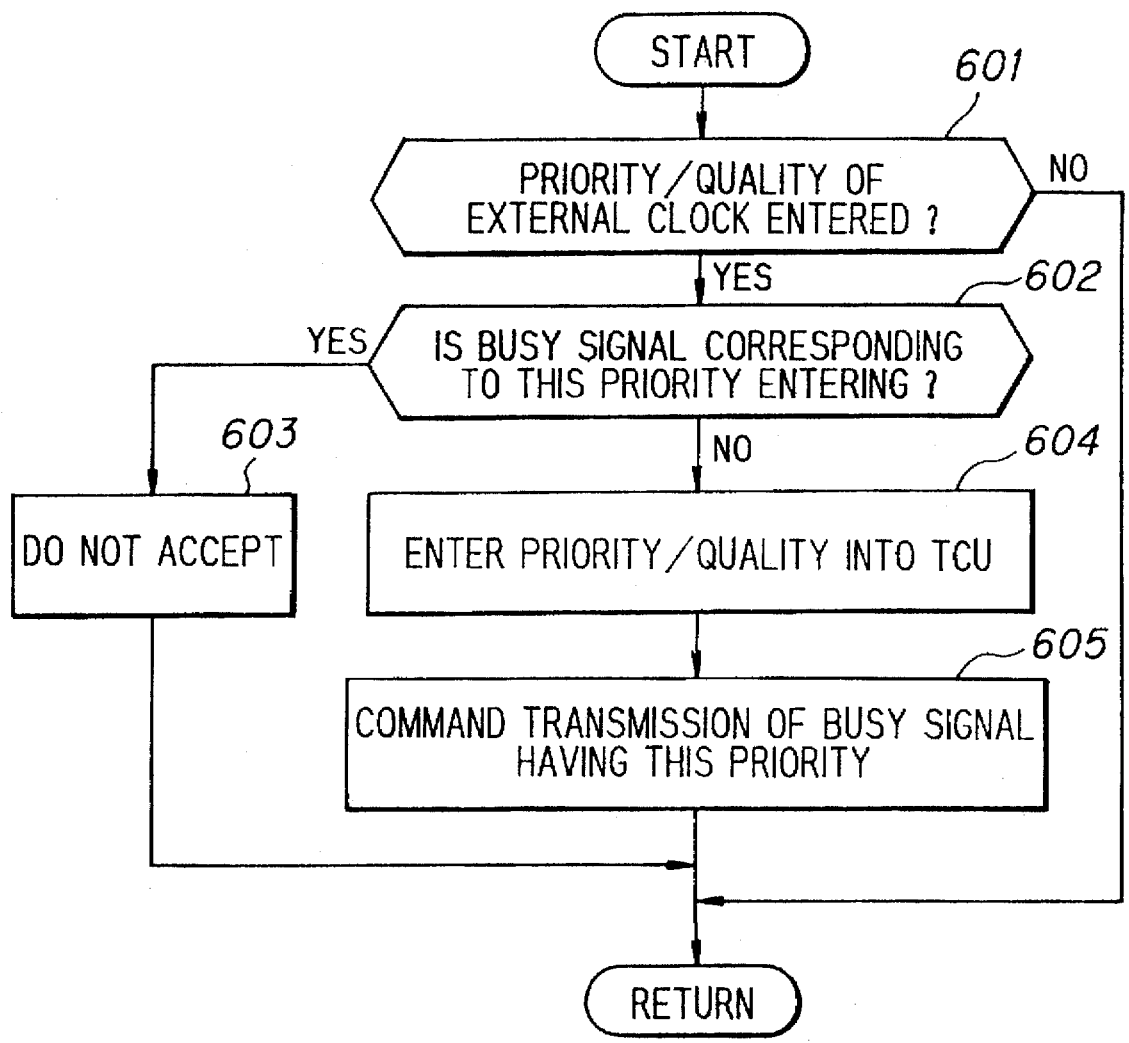
FIG. 19 is a flowchart of processing executed by a microcomputer of a shared unit.

FIG. 19 is a flowchart of processing for setting the priority value of the external clock.

When a priority value and a quality value of the external clock enter from the monitoring control console 40a ("YES" at step 601), the MPU 40b determines whether a busy signal corresponding to this priority value is entering (step 602). If the busy signal is entering, the setting of the aforementioned priority value and quality value is not accepted (step 603). If the busy signal is not entering, on the other hand, the MPU 40b enters the setting information into the equipment-clock determination processor 50a of the TCU 50 (step 604) and enters the priority value into the busy-signal transmitter 50d to designate transmission of the busy signal (step 605). Upon being so instructed, the busy-signal transmitter 50d sends the low-level signal to the busy signal line that corresponds to the above-mentioned priority value. As a result, the other channel boards become incapable of transmitting a clock corresponding to this priority value.

Further, the equipment-clock determination processor 50a executes the processing of FIG. 13, as in the case of the first embodiment, to decide the equipment clock, enter the equipment clock into each channel board via the equipment-clock sending line 73 and enter the priority value and quality value of the equipment clock into each channel board via the quality sending/receiving line 72.

Thus, even if a setting is made in such a manner that a clock having a prescribed priority value is outputted from a channel board redundantly, a busy signal corresponding to the priority value will already have been issued and, hence, the setting is not accepted. This makes it possible to reliably prevent redundant setting of clocks having the same priority value.

(D) THIRD EMBODIMENT

(a) Overall Construction

Figure 20:
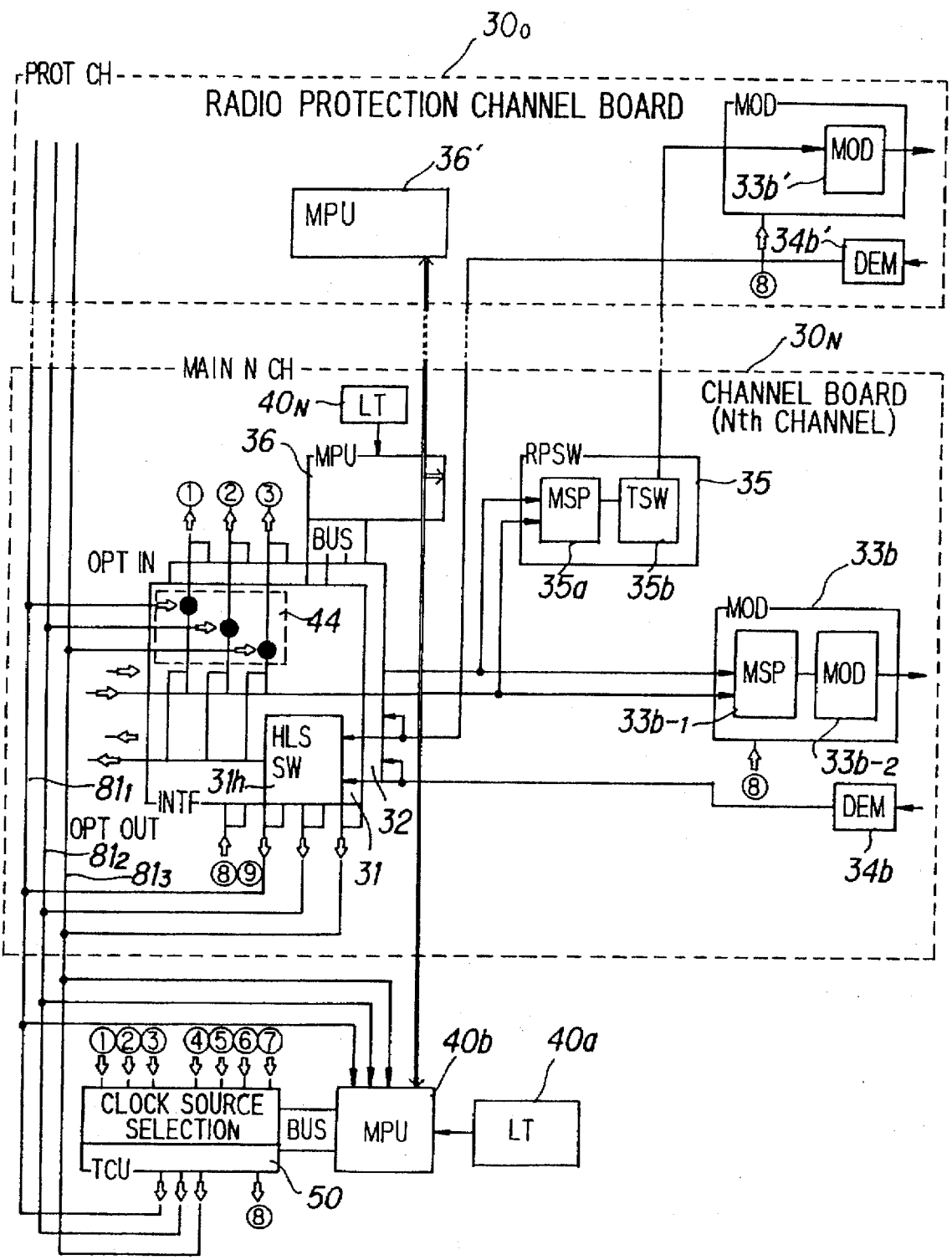
FIG. 20 is a diagram showing the overall construction of a radio apparatus according to a third embodiment of the present invention.

FIG. 20 is a diagram showing the overall construction of a third embodiment of a radio apparatus according to the present invention. Elements identical with those of the first embodiment shown in FIG. 4 are designated by like reference characters.

The third embodiment differs from the first embodiment of FIG. 4 in the following points:

(1) The channel board $30_N$ of only one channel among the N-number of channels is illustrated (the other channel boards are not shown).

(2) Setting of the priority values of clocks in each of the channel boards $30_1 \sim 30_N$ and of output/blockage of the clocks is performed separately from monitoring control consoles $40_1 \sim 40_N$.

(3) Busy-signal lines $81_1 \sim 81_3$ are provided for respective ones of the priority values and a busy signal indicating that output of a clock having a prescribed priority value is sent via a respective ones of these busy-signal lines.

(4) The optical interface of each channel board is provided with the clock transmission controller 44 which, if a busy signal has been issued, invalidates, by hardware, a clock transmission command set from the monitoring control console.

The structures and functions of the TCU 50 and MPU 40b are the same as those of the second embodiment.

The third embodiment resembles the second embodiment in that redundant entry is prevented by using busy signals. Whereas redundant entry is prevented by software under the control of the MPU 36 in the second embodiment, redundant entry is prevented by the clock transmission controller 44 in the third embodiment.

The busy-signal line $81_1$ is a line for sending a busy signal BSY1 conforming to the priority value PR1, the busy-signal line $81_2$ is a line for sending a busy signal BSY2 conforming to the priority value PR2, and the busy-signal line $81_3$ is a line for sending a busy signal BSY3 conforming to the priority value PR3. The busy-signal lines $81_1 \sim 81_3$ interconnect the corresponding terminals of the clock transmission controller 44 in each channel board, of the shared MPU 40b and of the shared TCU 50.

If, when the monitoring control consoles $40_1 \sim 40_N$ instruct the channel boards $30_1 \sim 30_N$ to send the clock having priority $PR1_1$, the channel boards $30_1 \sim 30_N$ respond by sending the clock to the clock supply line, the channel boards $30_1 \sim 30_N$ output the busy signal BSY1, which is at the low level, to the busy-signal line $81_1$ corresponding to the priority value PR1. This low-level busy signal BSY1 enters the clock transmission controllers 44 of all of the other channel boards as well as the shared MPU 40b. Further, when the shared monitoring control console 40a sets the priority value PR1 of the external clock, the TCU 50 sends the low-level busy signal BSY1 to the busy-signal line $81_1$ corresponding to the priority value PR1.

In a case where the low-level busy signal is being outputted to the busy-signal line $81_1$ for priority value PR1, the clock transmission controller 44 of each channel board exercises control in such a manner that transmission of the clock having the priority value PR1 is inhibited. Further, it is so arranged that in a case where the low-level busy signal BSY1 is being outputted to the busy-signal line $81_1$ for priority value PR1, the shared MPU 40b cannot attach the priority value PR1 to the external clock. In other words, first come, first served. Only the channel board for which transmission of the clock having priority value PR1 is set earliest can transmit the clock of priority value PR1. Alternatively, if the priority value PR1 is set for the external clock earliest, the priority value PR1 can be set for the external clock. The foregoing holds for the other priority values PR2, PR3 as well.

(b) Construction of Optical Interfaces

Figure 21:
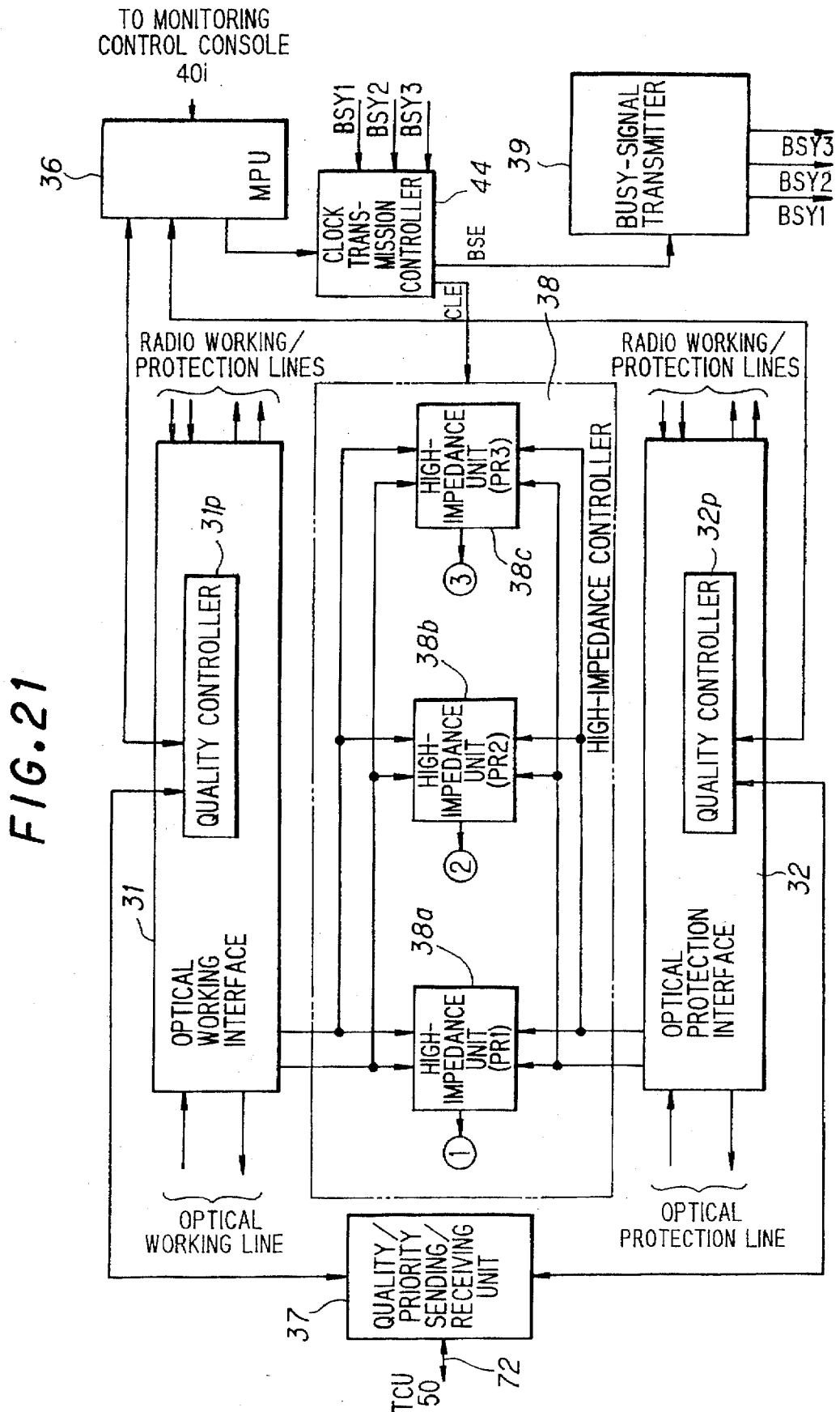
FIG. 21 is a diagram showing the overall construction of an optical interface.

FIG. 21 is a diagram illustrating the overall construction of the optical interface of each channel board according to the third embodiment. Elements identical with those of the interface according to the first embodiment of FIG. 11 are designated by like reference characters. This arrangement differs from that of FIG. 11 in that (1) the busy signal transmitting unit 39 is provided and it is so arranged that the busy signals BSY1~BSY3 are sent to the busy-signal lines $81_1 \sim 81_3$; and (2) the clock transmission controller 44 is provided and the busy signals BSY1~BSY3 enter the clock transmission controller 44 from the busy-signal lines $81_1 \sim 81_3$.

The busy-signal transmitter 39 has the construction shown in FIG. 17 and outputs the low-level busy signals BSY1~BSY3 to the busy-signal lines 811~813 based upon a busy-enable signal outputted, for each priority value, by the clock transmission controller 44. In a case where a busy signal (low level) having a prescribed priority value is entering, the clock transmission controller 44 functions to invalidate, by hardware, a command set from the monitoring control console $40_i$ (i=1~N) to transmit a clock having this priority value.

Figure 22:
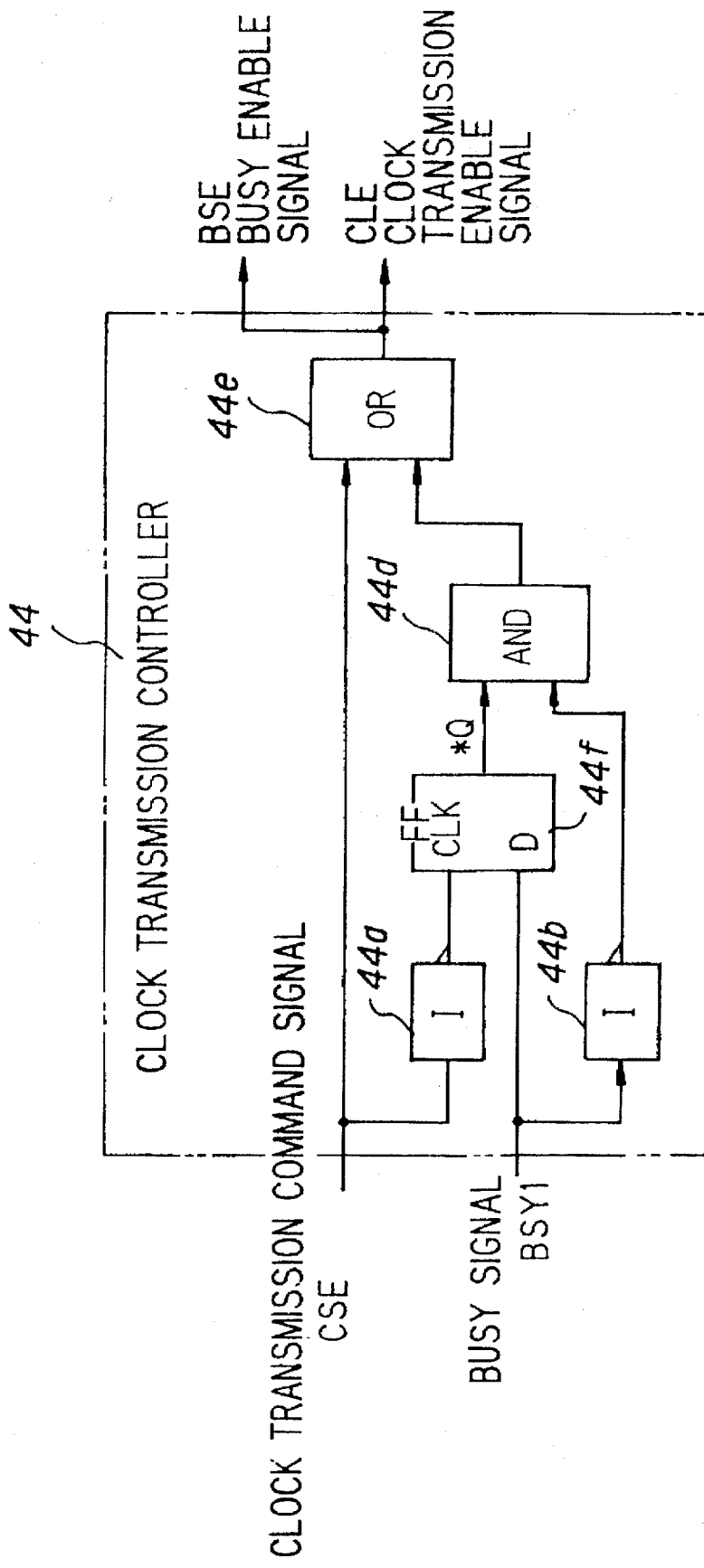
FIG. 22 is a diagram showing the construction of a clock transmission controller.
Figure 23:
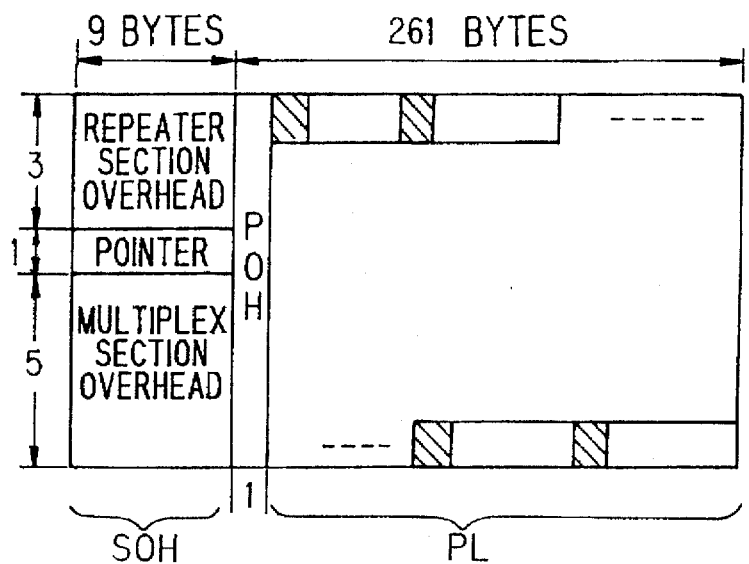
FIG. 23 is a diagram for describing the structure of an SDH frame according to the prior art.
Figure 24:
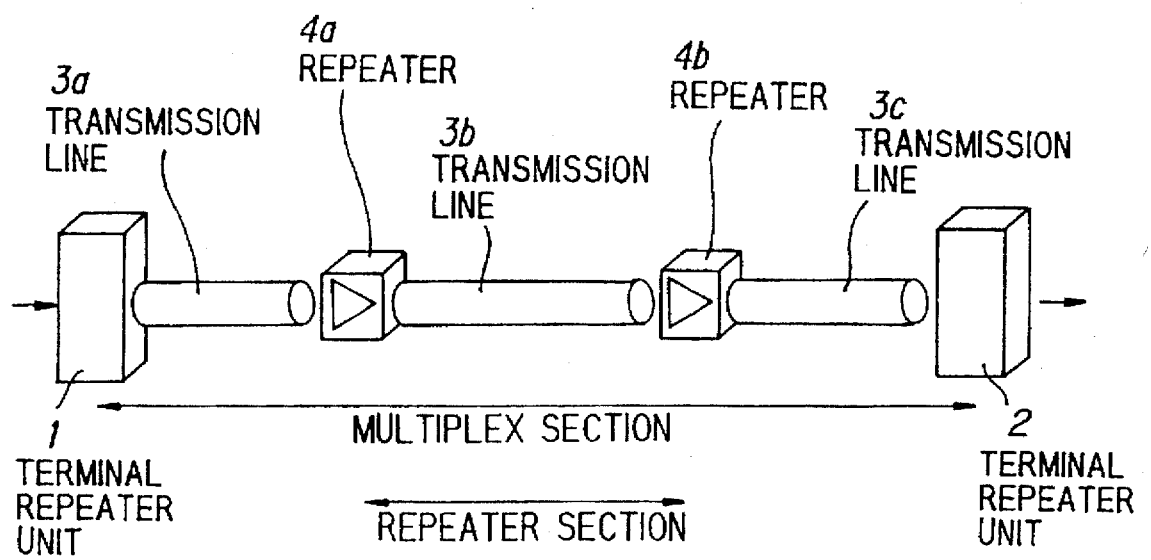
FIG. 24 is a diagram for describing a multiplex section and a repeater section according to the prior art.
Figure 27:
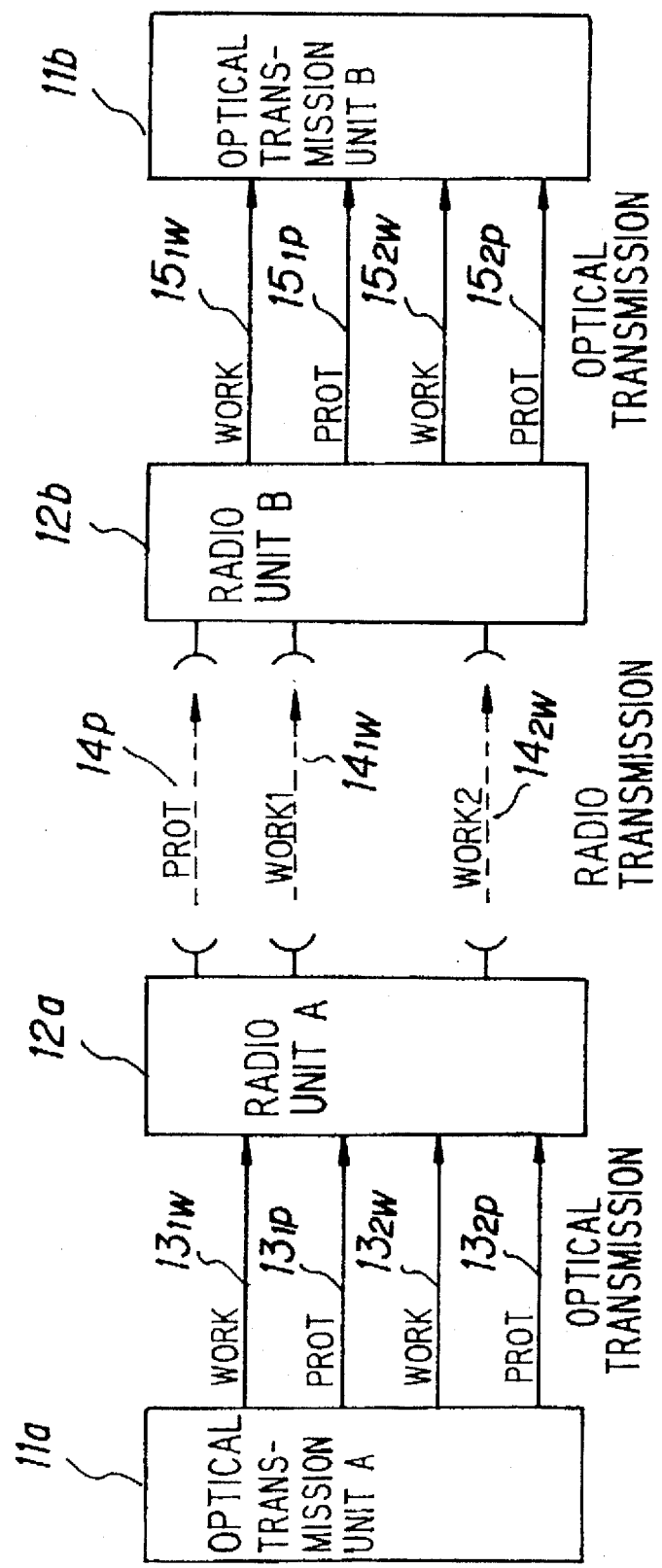
FIG. 27 is a diagram showing the construction of an SDH network according to the prior art.
Figure 28:
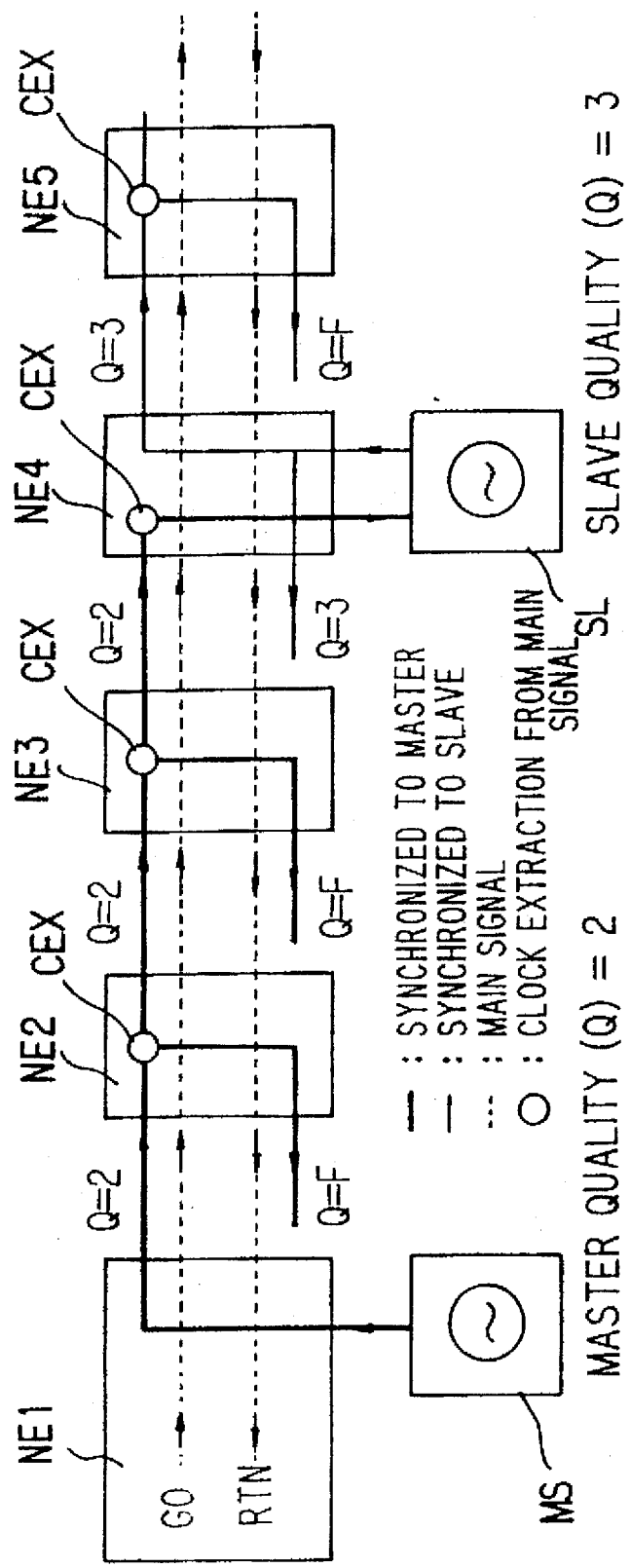
FIG. 28 is a diagram showing the construction of a synchronous network (when a master is free of faults)
Figure 30:
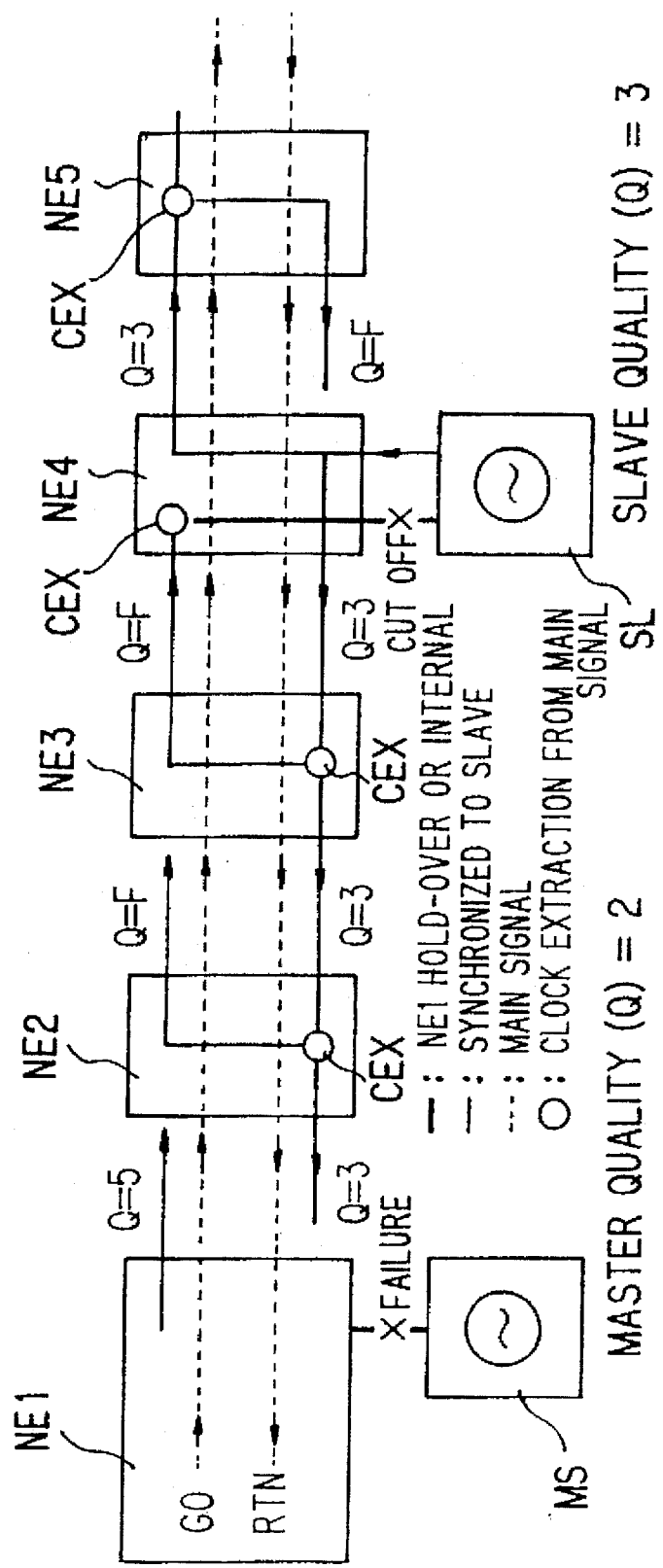
FIG. 30 is a diagram showing the construction of a synchronous network (when a fault has developed in a master)
Figure 31:
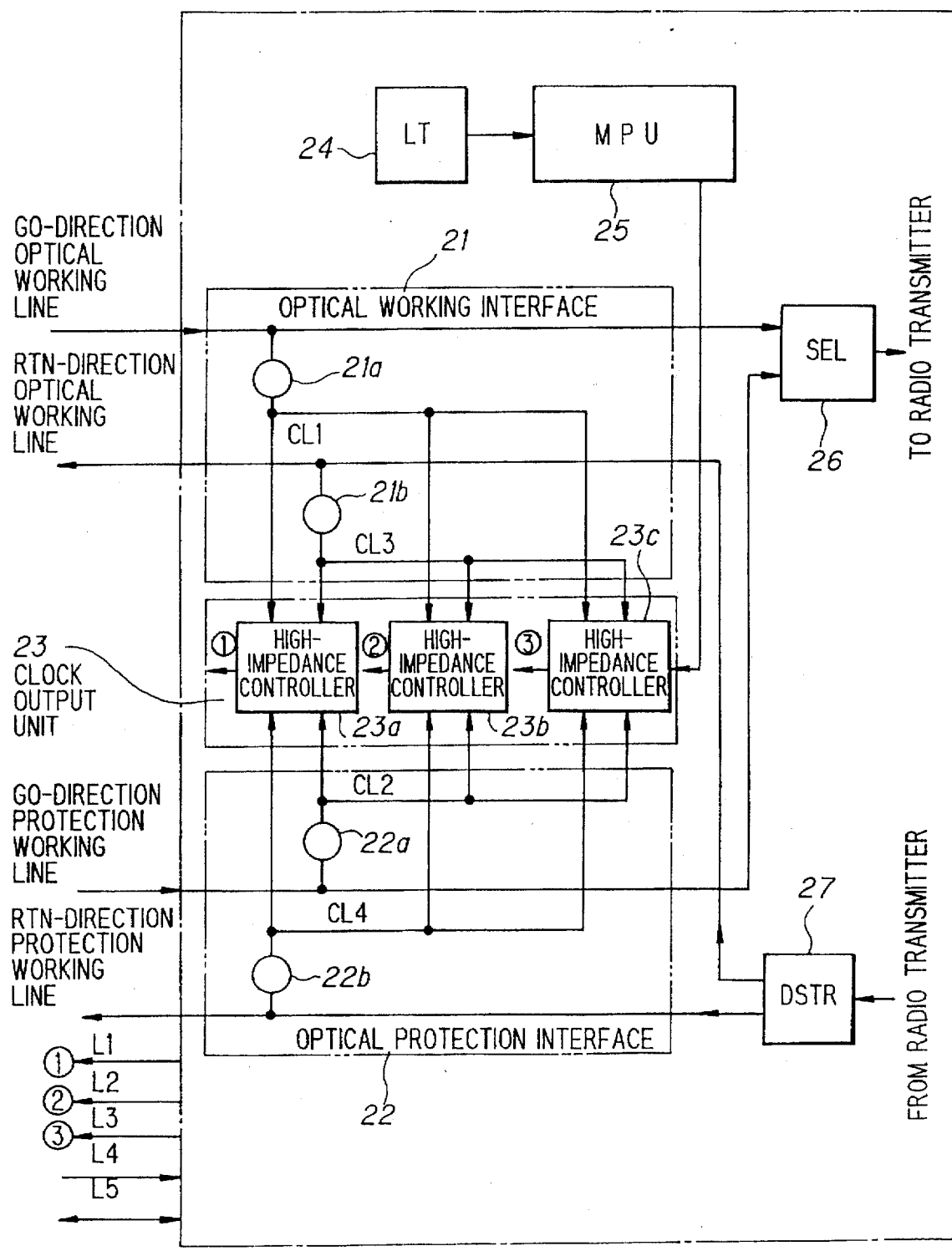
FIG. 31 is a diagram showing the arrangement of principal elements in a channel board related to clock selection.
Figure 32:
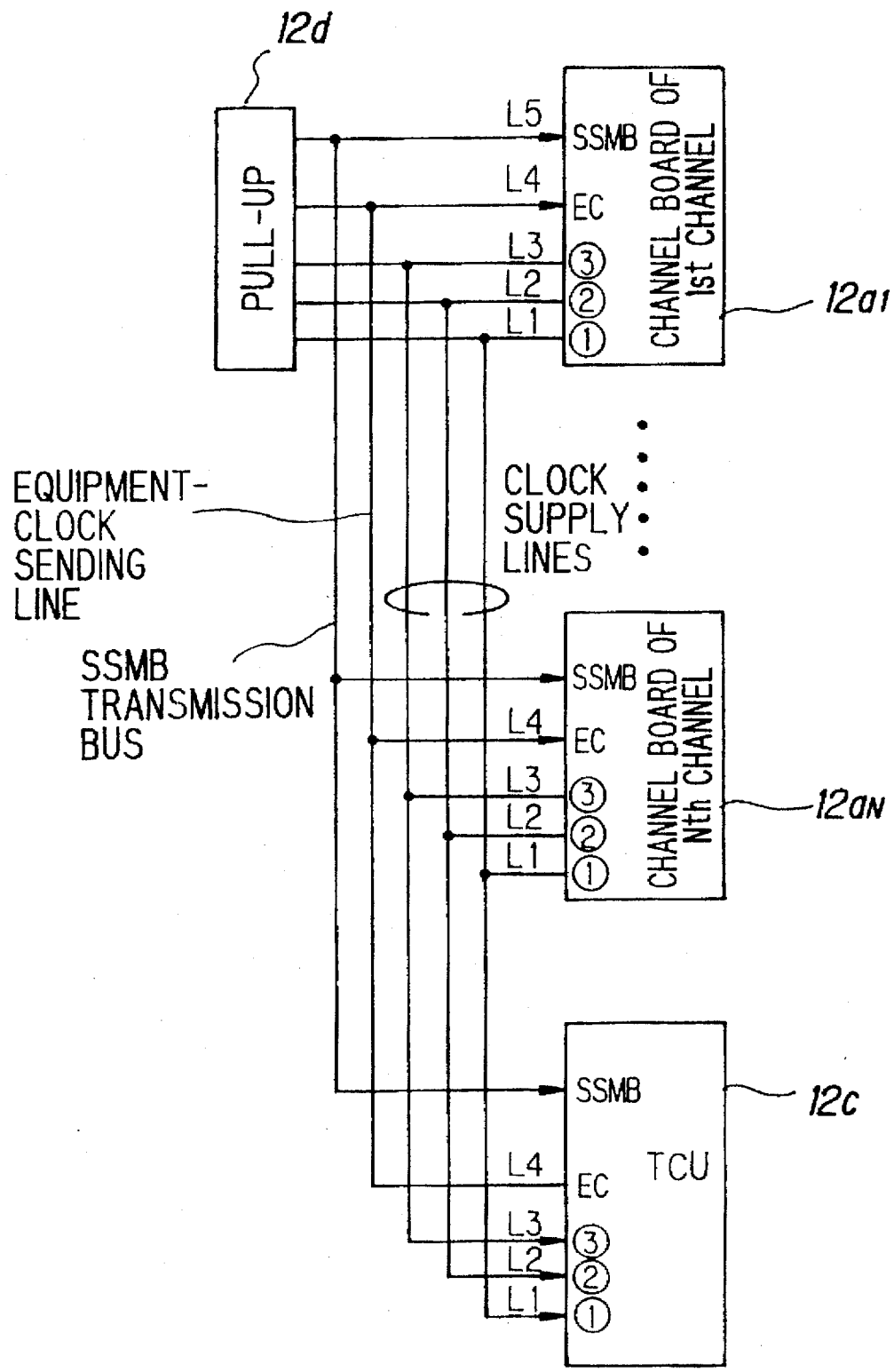
FIG. 32 is a diagram showing the connection relationship between the channel boards of N-number of channels and a TCU.
Figure 33:
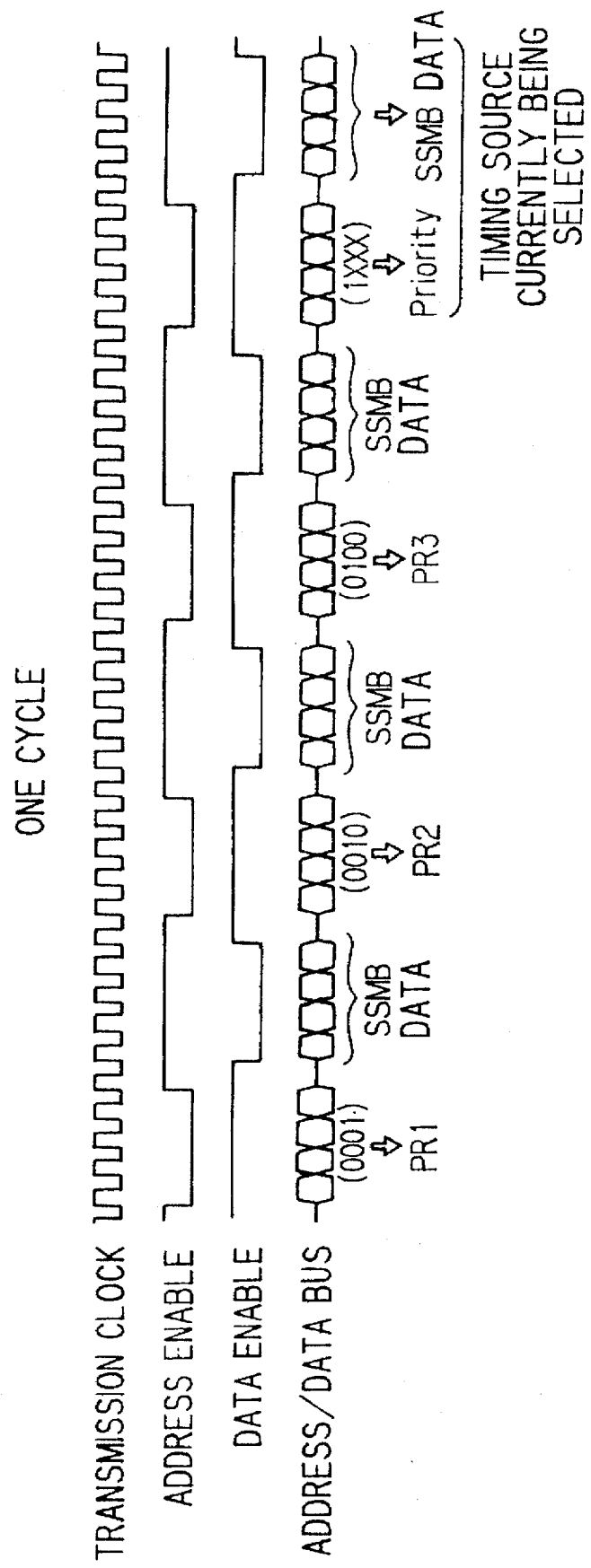
FIG. 33 is a time chart of signals on each of an SSMB transmission bus.
Figure 36:
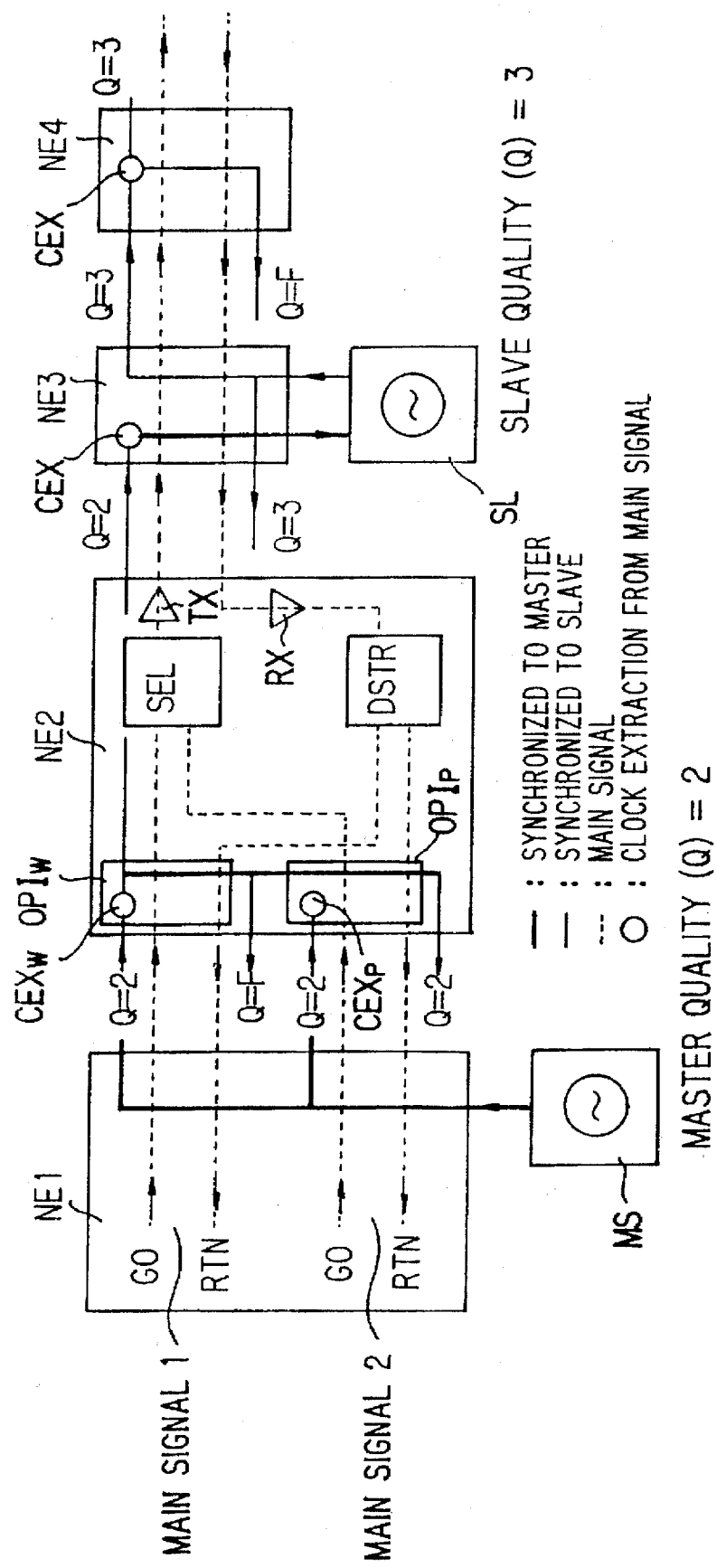
FIG. 36 is a diagram showing the construction of a synchronous network when there is redundancy (master is normal)
Figure 37:
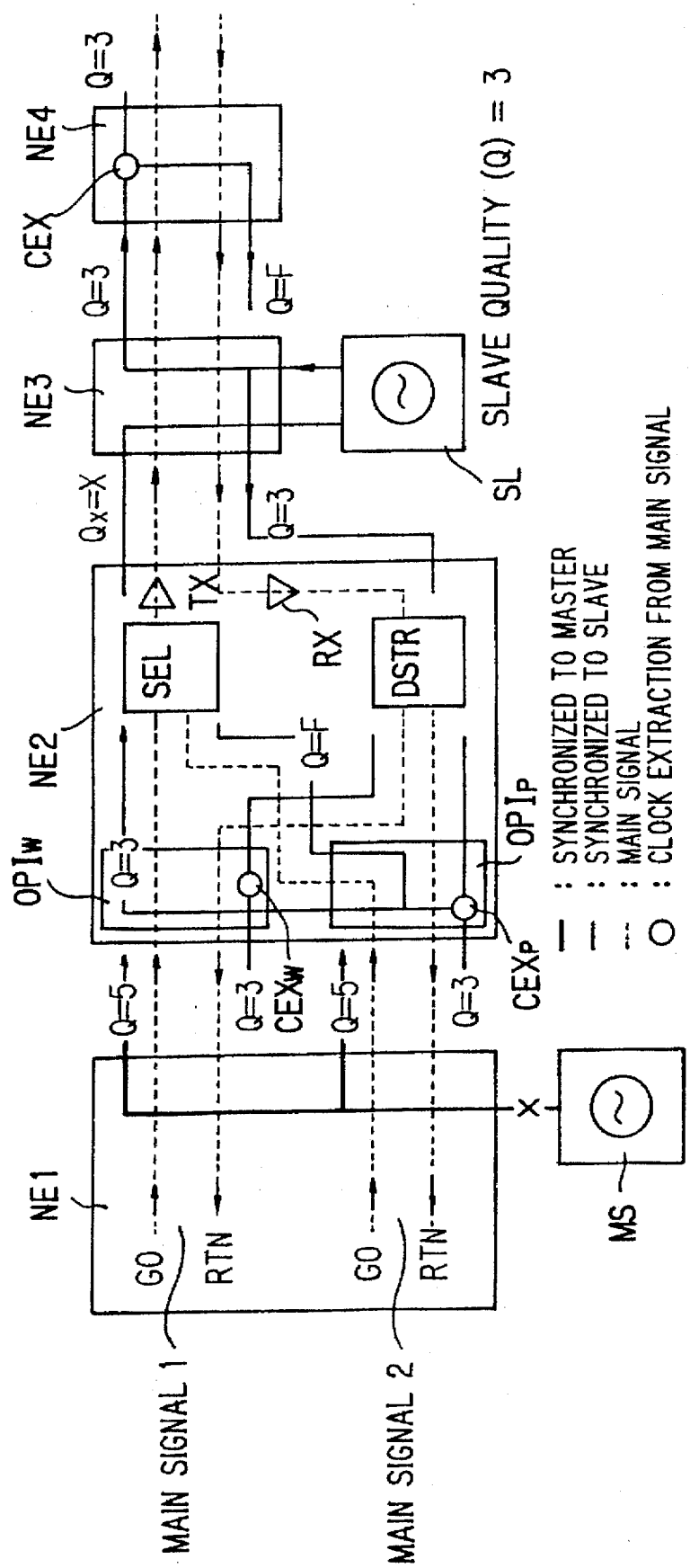
FIG. 37 is a diagram showing the construction of a synchronous network when there is redundancy (master is abnormal).

FIG. 22 is a diagram showing the construction of the clock transmission controller 44. FIG. 22 shows the circuitry corresponding to the priority value PR1; similar circuitry is provided for each of the other priority values PR2 and PR3. The clock transmission controller 44 includes inverters 44a, 44b for inverting logic, an AND gate 44d, an OR gate 44e and a flip-flop 44f. The busy signal BSY1 indicates the busy state (i.e., a state in which another channel board is already instructing output of a clock having priority value PR1) when it is at the low level. When the busy signal BSY1 is at the high level, this indicates that the state is not the busy state. Further, a clock transmission command signal CSE commands transmission of the clock of priority value PR1 when it is at the low level and commands blockage of the clock when it is at the high level.

When the busy signal BSY1 is at the high level, the output of the AND gate 44d falls to the low level. As a consequence, the OR gate 44e issues a signal conforming to the logic value of the clock transmission command signal CSE outputted by the MPU 36. More specifically, when output of the clock having priority value PR1 is designated from the monitoring control console $40_i$ with the busy signal BSY1 at the high level, the MPU 36 outputs the clock transmission command signal CSE having the low level. As a result, the output of the OR gate 44e falls to the low level so that the clock transmission controller 44 enters a clock transmission enable signal CLE into the high-impedance unit 38a to command output of the clock and enters a busy enable signal BSE into the busy-signal transmitter 39 to command transmission of the busy signal BSY1. In response to the clock transmission command, the high-impedance unit 38a outputs the clock having priority value PR1 and the busy-signal transmitter 39 outputs the low-level busy signal BSY1.

It should be noted that the Q output of the flip-flop 44f is at the high level and the *Q output is at the low level. The output of the AND gate 44d thenceforth assumes the low level regardless of the logic level of the busy signal BSY1. This is to make the setting by the monitoring control console 40i effective even if the busy signal BSY is at the low level.

When the busy signal BSY1 is at the low level, the output of AND gate 44d attains the high level and so does the output of the OR gate 44e. In other words, the high-level signal is outputted by the OR gate 44e regardless of the logic value of the clock transmission command signal CSE produced by the MPU 36. As a consequence, the clock transmission controller 44 enters a clock blocking signal into the high-impedance unit 38a to command blockage of the clock and does not enter the busy enable signal BSE into the busy-signal transmitter 39. As a result, in response to the clock blockage command, the high-impedance 38a performs high-impedance control to thereby block output of the clock having the priority value PR1, and the busy-signal transmitter 39 does not output the low-level busy signal BSY1.

Thus, even if output of a clock having a prescribed priority value is set redundantly, the latter setting is ignored and the synchronous network is prevented from becoming desynchronized.

In accordance with the present invention as described above, a single setting unit (monitoring control console) sets, in centralized fashion, the priority values of the clocks of each channel board and whether clocks are to be outputted or blocked. As a result, settings can be made without error. In particular, it is possible to prevent a situation in which a synchronous network is desynchronized owing to output of two or more clocks on one clock supply line as the result of double entry of the same clock.

In accordance with the present invention, a clock having the best quality is found in an equipment-clock decision unit (TCU) upon taking quality value and priority value into account, and the clock obtained is adopted as the equipment clock. This makes it possible to construct a synchronous network using the clock having the best quality as the equipment clock.

In accordance with the present invention, the clock having the best quality is adopted as the equipment clock in the apparatus-clock decision unit (TCU) from among the equipment clock and the clocks extracted from lines. As a result, a synchronous network can be enlarged by placing, at appropriate locations in the network, external clock sources of high priority values and qualities, e.g., jitter-free clock sources (G.812) which absorb the jitter of the reference clock.

In accordance with the present invention, the quality value Q=F ("Don't use for sync"), which indicates that a clock cannot be used as a synchronizing signal, is attached to a main signal on the same line but in the direction opposite that of arrival of a main signal from which a clock serving as the equipment clock was extracted. As a result, a clock loop will not be formed and the synchronous network will become desynchronized.

In a case where redundant optical interfaces are provided, the present invention is such that if a clock contained in a radio reception signal is the equipment clock, the optical protection (standby) interface (or the optical working interface) will so inform the optical working interface (or the optical protection interface, in response to which the optical working interface (or optical protection interface) performs control in such a manner that the quality Q of the signal outputted to the side of the radio line is made F. As a result, the path of signals using identical clocks will not form a loop and desynchronization of the synchronous network will not occur.

The present invention is such that in a case where a clock having a prescribed priority value has been sent to a clock supply line, a channel board sends a busy signal corresponding to this priority value to a busy-signal line. When output of a clock having this priority value has been commanded from a setting unit, other channel boards determine whether the busy signal corresponding to the above-mentioned priority value is being outputted on the busy-signal line. Clock transmission is commanded if the busy signal is not being outputted and blockage of the clock is commanded if the busy signal is being outputted. This means that even if the operator accidentally makes settings that cause a clock having a prescribed priority value to be outputted redundantly from each channel board, the latter of the settings can be ignored. This makes it possible to prevent redundant settings in reliable fashion.

As many apparently widely different embodiments of the present invention can be made without departing from the spirit and scope thereof, it is to be understood that the invention is not limited to the specific embodiments thereof except as defined in the appended claims.

What is claimed is:

1. A radio apparatus in a synchronous digital hierarchy network in which a radio transmission line having a plurality of radio lines is installed between optical transmission lines each having a plurality of optical lines, said radio apparatus comprising:

a plurality of channel boards, each of which is provided between an optical line and a radio line, for transmitting an optical signal received from the optical line to the radio line and transmitting a signal received from the radio line to the optical line;

a setting unit, which is provided to be shared by each channel board, for attaching, per channel board, priority value to clock contained in each signal sent in via an optical line and a radio line, and for setting, per channel board, whether the clock of each priority value is to be outputted or not;

an equipment-clock decision unit for deciding a clock shared by the entire apparatus as an equipment clock; and a clock supply line, which is provided for each priority value, for connecting a clock output terminal for a prescribed priority value in each channel board and a clock input terminal for said priority value in the equipment-clock decision unit, and for entering a clock having this priority value into said equipment-clock decision unit from a prescribed channel board;

wherein a channel board that has outputted a clock of prescribed priority value via said clock supply line extracts quality value data from a signal containing this clock and enters the quality value into said equipment-clock decision unit, and said equipment-clock decision unit decides an equipment clock based upon a quality value and a priority value of each entered clock and enters the equipment clock into each channel board.

2. The apparatus according to claim 1, wherein said equipment-clock decision unit adopts a clock having the highest quality value as the equipment clock and, if there are two or more clocks having identical quality values, adopts the clock having the higher priority value as the equipment clock.

3. The apparatus according to claim 1, further comprising:

an equipment-clock sending line; and a quality sending/receiving line connecting a quality sending/receiving terminal of each channel board and a quality sending/receiving terminal of said equipment-clock decision unit;

wherein said channel board has a quality extractor for extracting quality value data from a signal that has been received from a line;

the quality extractor of a channel board that sends a clock of a prescribed priority value to said equipment-clock decision unit via said clock supply line enters the priority value of said clock and the extracted quality value into said equipment-clock decision unit via said quality sending/receiving line; and said equipment-clock decision unit decides the equipment clock based upon the priority value and quality value that have been received via said quality sending/receiving line and sends said equipment clock to each channel board via said equipment-clock sending line.

4. The apparatus according to claim 3, wherein said equipment-clock decision unit sends the quality value and priority value of the equipment clock to each channel board via said quality sending/receiving line.

5. The apparatus according to claim 1, further comprising an external clock generator for entering an external clock into said equipment-clock decision unit;

wherein a priority value and a quality value of the external clock are entered into said equipment-clock decision unit from said setting unit; and said equipment-clock decision unit decides the equipment clock based upon the quality value and priority value of a clock that has entered from a channel board and the quality value and priority value of the external clock, and enters this equipment clock into each channel board.

6. The apparatus according to claim 5, wherein said equipment-clock decision unit adopts a clock having the highest quality value as the equipment clock and, if there are two or more clocks having identical quality values, adopts the clock having the higher priority value as the equipment clock.

7. The apparatus according to claim 1, wherein each optical line is constituted by a line in the outgoing direction and a line in the return direction, and each channel board has a quality insertion unit for attaching a quality value, which has entered from said equipment-clock decision unit, to a signal having a direction identical with that in which a clock serving as the equipment clock arrives, and to a signal on a line different from that on which said clock arrives, and attaches a quality value Q=F to a signal on the same line but in a direction opposite that in which said clock arrives, said quality value Q=F indicating that said clock is not to be used as a synchronizing signal.

8. The apparatus according to claim 7, wherein said channel board includes:

an optical working interface corresponding to a optical working line;

an optical protection interface corresponding to an optical protection line;

a radio transmitter for transmitting radio signal;

a radio receiver for receiving radio signal;

a selector for entering one signal of signals that have entered from both of said interfaces into said radio transmitter;

a distributor for distributing radio reception signal, which has been outputted by said radio receiver, to both of said interfaces; and notification means which, if a clock contained in the radio reception signal that has entered said optical protection interface becomes the equipment clock, so notifies said optical working interface, and if a clock contained in the radio reception signal that has entered said optical working interface becomes the equipment clock, so notifies said optical protection interface;

wherein a quality insertion unit of said optical working interface that has received notification from said notification means attaches, to the signal entered into said selector, the quality value Q=F, and a quality insertion unit of said optical protection interface that has received notification from said notification means attaches, to the signal entered into said selector, the quality value Q=F.

9. A radio apparatus in a synchronous digital hierarchy network in which a radio transmission line having a plurality of radio lines is installed between optical transmission lines each having a plurality of optical lines, said radio apparatus comprising:

a plurality of channel boards, each of which is provided between an optical line and a radio line, for transmitting an optical signal received from the optical line to the radio line and transmitting a signal received from the radio line to the optical line;

a setting unit, which is provided to correspond to each channel board, for attaching priority value to clock contained in each signal sent in via an optical line and a radio line of the corresponding channel board, and for setting whether the clock of each priority value is to be outputted from the channel board or not;

an equipment-clock decision unit for deciding a clock shared by the entire apparatus as an equipment clock; and a clock supply line, which is provided for each priority value, for connecting a clock output terminal for a prescribed priority value in each channel board and a clock input terminal for said priority value in the equipment-clock decision unit, and for entering a clock having this priority value into said equipment-clock decision unit from a prescribed channel board; and a busy-signal line, which is provided for each priority value, for sending a busy signal by which a channel board notifies other channel boards of the fact that output of a clock having a prescribed priority value has been commanded;

wherein said channel board includes:

a clock output controller which, when output of a clock having a prescribed priority value has been commanded from said setting unit, outputs said clock when a busy signal corresponding to said priority value is not entering and inhibits output of said clock when the busy signal corresponding to said priority value is entering; and a busy-signal transmitter which, if a clock having a prescribed priority value is outputted to said clock supply line, sends the busy signal corresponding to said priority value to said busy signal line;

wherein a channel board that outputs a clock of a prescribed priority value via said clock supply line extracts quality value data from a signal containing this clock and enters the quality value into said equipment-clock decision unit; and said equipment-clock decision unit decides the equipment clock based upon the quality value and priority value of each entered clock and enters the equipment clock into each channel board.

10. The apparatus according to claim 9, wherein said equipment-clock decision unit adopts a clock having the highest quality value as the equipment clock and, if there are two or more clocks having identical quality values, adopts the clock having the higher priority value as the equipment clock.

11. The apparatus according to claim 9, wherein said clock output controller has a microcomputer and a clock sending/blocking unit responsive to a command from said microcomputer for sending/blocking a clock of a prescribed priority value;

wherein when output of the clock having the prescribed priority value has been commanded from said setting unit, said microcomputer determines whether a busy signal corresponding to said priority value is entering;

said microcomputer commanding said clock sending/receiving unit to output said clock if the busy signal corresponding to said priority value is not entering and to block said clock if the busy signal corresponding to said priority value is entering.

12. The apparatus according to claim 9, further comprising:

an equipment-clock sending line; and a quality sending/receiving line connecting a quality sending/receiving terminal of each channel board and a quality sending/receiving terminal of said equipment-clock decision unit;

wherein said channel board has a quality extractor for extracting quality value data from a signal that has been received from a line;

the quality extractor of a channel board that sends a clock of a prescribed priority value to said equipment-clock decision unit via said clock supply line enters the priority value of said clock together with the quality value into said equipment-clock decision unit via said quality sending/receiving line; and said equipment-clock decision unit decides the equipment clock based upon the priority value and quality value that have been received via said line and sends said equipment clock to each channel board via said equipment-clock sending line.

13. The apparatus according to claim 9, further comprising:

an external clock generator for entering an external clock into said equipment-clock decision unit; and a setting unit for entering a priority value and a quality value of the external clock into said equipment-clock decision unit;

wherein said equipment-clock decision unit includes:
a busy-signal transmitter which, when the priority value of the external clock has been entered, sends a busy signal to a busy-signal line that corresponds to the priority value of said external clock; and means for deciding the equipment clock based upon the quality value and priority value of a clock that has entered from a channel board and the quality value and priority value of the external clock, and entering said equipment clock into each channel board.

14. The apparatus according to claim 13, wherein said equipment-clock decision unit adopts a clock having the highest quality value as the equipment clock and, if there are two or more clocks having identical quality values, adopts the clock having the higher priority value as the equipment clock.

15. The apparatus according to claim 12, wherein said equipment-clock decision unit sends the quality value and priority value of the equipment clock to each channel board via said quality sending/receiving line.

16. The apparatus according to claim 1, wherein each optical line is constituted by a line in the outgoing direction and a line in the return direction, and each channel board has a quality insertion unit for attaching a quality value, which has entered from said equipment-clock decision unit, to a signal having a direction identical with that in which a clock serving as the equipment clock arrives, and to a signal on a line different from that on which said clock arrives, and attaches a quality value Q=F to a signal on the same line but in a direction opposite that in which said clock arrives, said quality value Q=F indicating that said clock is not to be used as a synchronizing signal.

17. The apparatus according to claim 16, wherein said channel board includes:

an optical working interface corresponding to a optical working line;

an optical protection interface corresponding to an optical protection line;

a radio transmitter for transmitting radio signal;

a radio receiver for receiving radio signal;

a selector for entering one signal of signals that have entered from both of said interfaces into said radio transmitter;

a distributor for distributing radio reception signal, which has been outputted by said radio receiver, to both of said interfaces; and notification means which, if a clock contained in the radio reception signal that has entered said optical protection interface becomes the equipment clock, so notifies said optical working interface, and if a clock contained in the radio reception signal that has entered said optical working interface becomes the equipment clock, so notifies said optical protection interface;

wherein a quality insertion unit of said optical working interface that has received notification from said notification means attaches, to the signal entered into said selector, the quality value Q=F, and a quality insertion unit of said optical protection interface that has received notification from said notification means attaches, to the signal entered into said selector, the quality value Q=F.

* * * * *